(12) United States Patent
Xu et al.

(10) Patent No.: US 7,697,727 B2
(45) Date of Patent: Apr. 13, 2010

(54) AUTOMATED SURFACE DISTRESS MEASUREMENT SYSTEM

(75) Inventors: Bugao Xu, Austin, TX (US); Yaxiong Huang, Xian (CN)

(73) Assignee: Board of Regents, The University of Texas System, Austin, TX (US)

( * ) Notice: Subject to any disclaimer, the term of this patent is extended or adjusted under 35 U.S.C. 154(b) by 964 days.

(21) Appl. No.: 11/439,551

(22) Filed: May 23, 2006

(65) Prior Publication Data

US 2006/0276985 A1 Dec. 7, 2006

Related U.S. Application Data

(60) Provisional application No. 60/683,935, filed on May 23, 2005.

(51) Int. Cl.
*G06K 9/00* (2006.01)
*G01N 37/00* (2006.01)
*G01N 19/08* (2006.01)
*G01D 1/00* (2006.01)

(52) U.S. Cl. .................. 382/108; 702/81; 702/127; 73/53.06

(58) Field of Classification Search .......... 382/104, 382/108, 285; 73/53.06, 104, 146; 702/33, 702/40, 57, 189, 81, 127; 301/40.5
See application file for complete search history.

(56) References Cited

U.S. PATENT DOCUMENTS 4,899,296 A * 2/1990 Khattak .................. 702/40

6,615,648 B1 * 9/2003 Ferguson et al. ............ 73/146
6,947,577 B2 * 9/2005 Stam et al. .................. 382/104

OTHER PUBLICATIONS

Cline, Gregory D., et al., "Automated Data Collection for Pavement Condition Index Survey," annual meeting of Transportation Research Board, 2003 (Abstract).
Fukuhara, T., et al., "Automatic Pavement-Distress-Survey System," J. Transportation Engineering, ASCE (1990), 116(3):280-286.
Fukai, H., et al., "An Image Processing Method to Detect Road Surface Condition Using Optical Spatial Frequency," Intelligent Transportation System, Conference Publication, 1005-1009, IEEE (1997).
Kil, D. et al., "Automatic Road-Distress Classification and Identification Using a Combination of Hierarchical Classifications and Expert System-Subimage & Object Processing," Image Processing, Conference Publication, vol. 2:414-417. IEEE (1997).
McNeil, S., et al. "Evaluation of Errors in Automated-Distress Data Acquisition," J. Transportation Engineering, ASCE, (1991), 117(2):224-241.

(Continued)

*Primary Examiner*—Abolfazl Tabatabai
(74) *Attorney, Agent, or Firm*—Chainey P. Singleton; Edwin S. Flores; Chalker Flores, LLP

(57) ABSTRACT

The present invention is an apparatus, system and method for determining surface conditions in real time including a real time digital imaging device positioned relative to capture one or more images of a surface and an image processing device that processes the one or more images to identify defects (e.g., cracks) in the surface, wherein the imaging processing device determines the intensity of one or more regions of the one or more images, compares the intensity of one of the one or more regions to the intensity of another of the one or more regions, and designates the region as defective.

14 Claims, 30 Drawing Sheets

OTHER PUBLICATIONS

Pynn, J., et al., "Automated Identification of Crack in Road Surface, Image Processing and its Application," Conference Publication No. 465:671-675, IEEE (1999).

Wang, K., "Design and Implementation of Automated System for Pavement Surface Distress Survey," Journal of Infrastructure System (2000), 6(1):24-32.

* cited by examiner

FIGURE 10
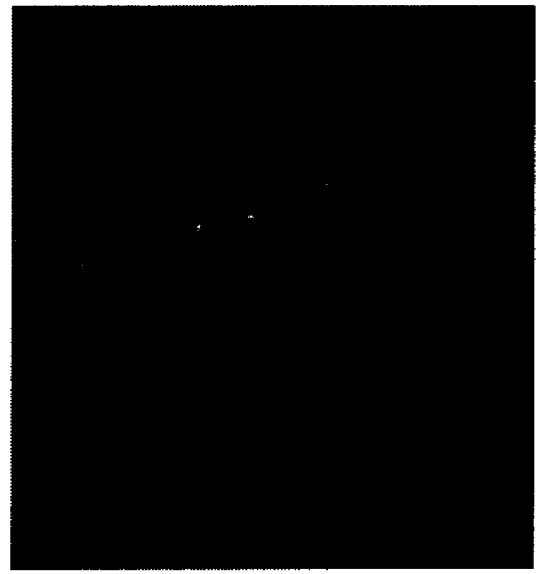
b
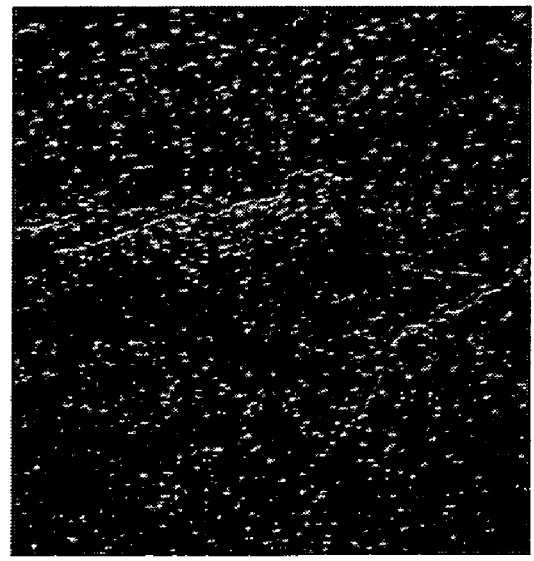
a

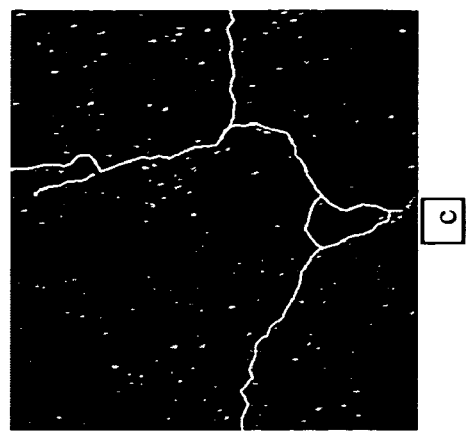
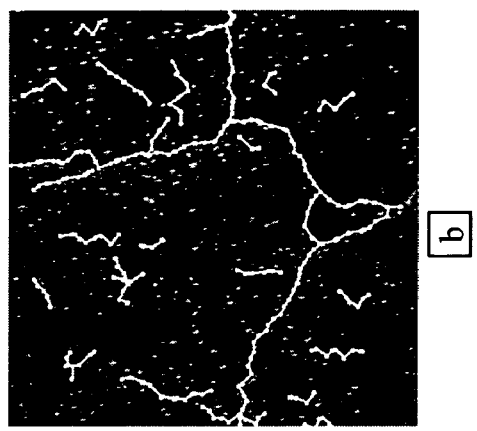
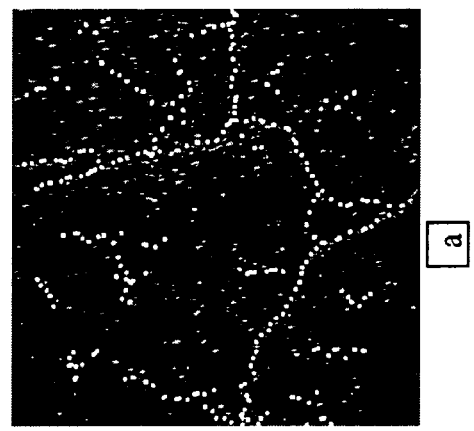
FIGURE 11

FIGURE 16
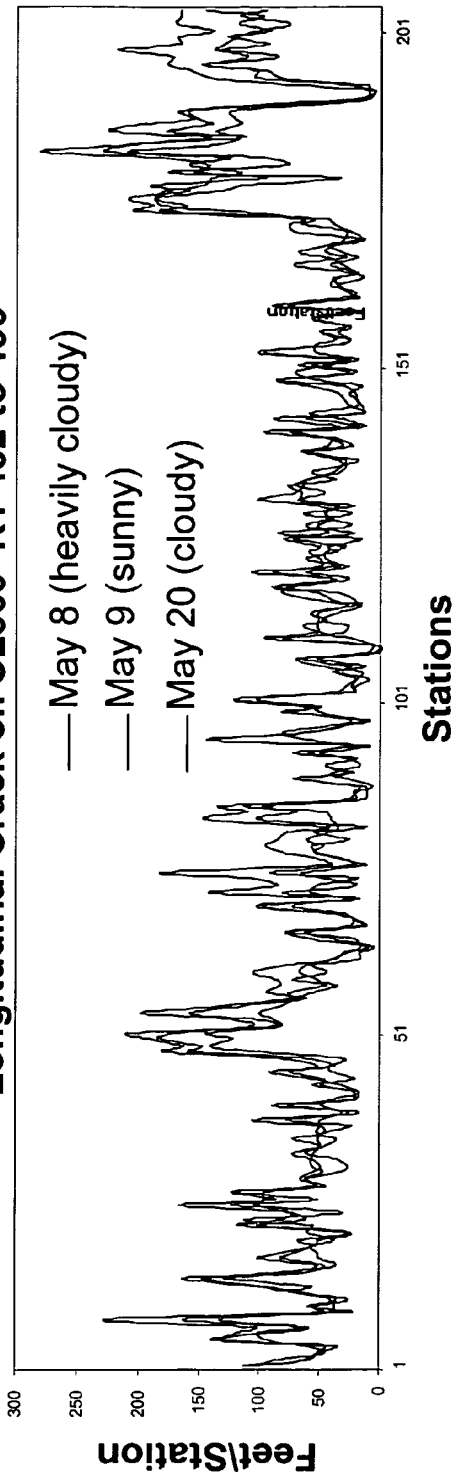
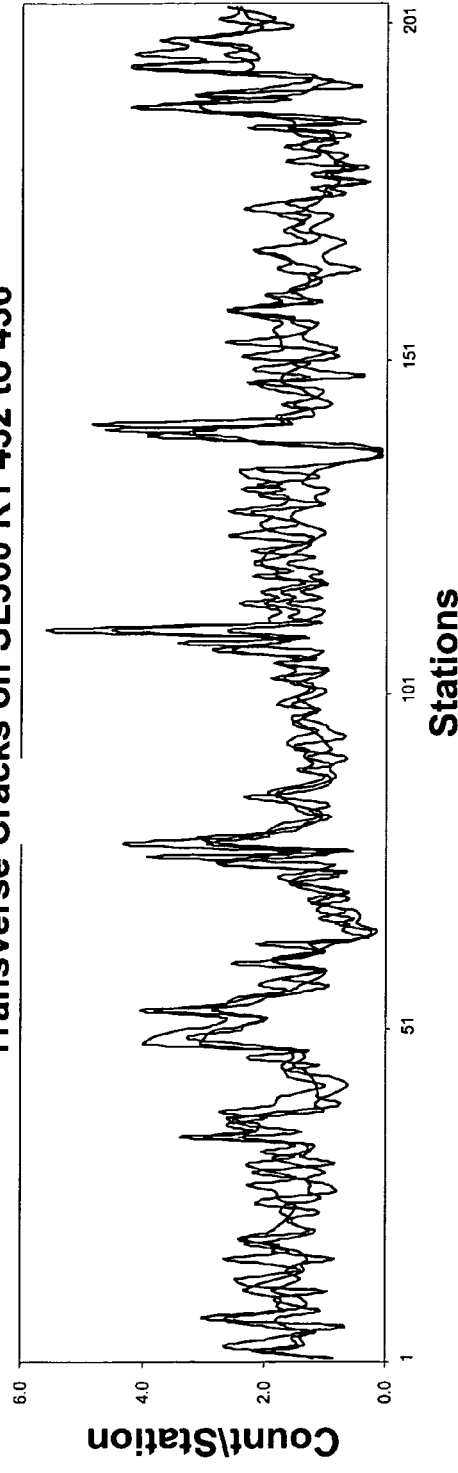

FIGURE 17
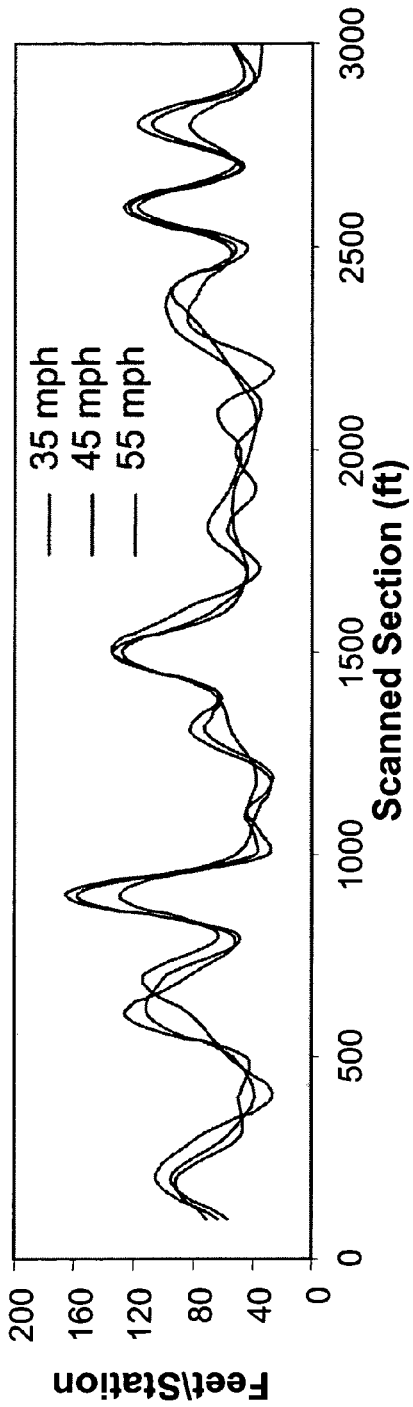
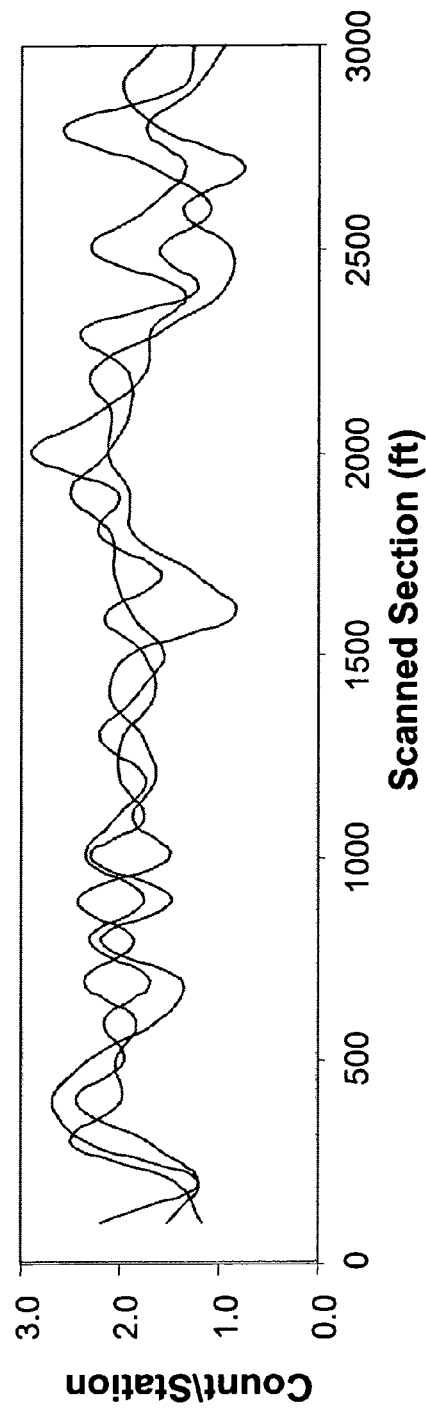

FIGURE 25

| | K1-1 | K1-2 | K1-3 | K2-1 | K2-2 | K2-3 | K3-1 | K3-2 |
|---|---|---|---|---|---|---|---|---|
| | 0.845 | | | | | | | |
| | 0.757 | 0.843 | | | | | | |
| | 0.800 | 0.829 | 0.722 | | | | | |
| | 0.744 | 0.730 | 0.730 | 0.906 | | | | |
| | 0.673 | 0.836 | 0.742 | 0.699 | 0.724 | | | |
| | 0.775 | 0.785 | 0.680 | 0.808 | 0.695 | 0.651 | | |
| | 0.716 | 0.745 | 0.665 | 0.905 | 0.851 | 0.680 | 0.872 | |
| | | 0.746 | 0.668 | ■ | 0.669 | ■ | 0.842 | 0.662 |

FIGURE 26

| | | | | | | | | |
|---|---|---|---|---|---|---|---|---|
| | | | | | 0.261 | 0.217 | | |
| | | | | 0.139 | 0.481 | 0.477 | | |
| | | | 0.241 | 0.453 | 0.654 | 0.631 | 0.296 | |
| | | 0.278 | 0.542 | 0.532 | 0.906 | 0.927 | 0.573 | |
| | 0.503 | 0.480 | 0.601 | 0.905 | 0.792 | 0.847 | 0.681 | |
| 0.705 | 0.712 | 0.626 | 0.933 | | 0.869 | 0.907 | 0.906 | |
| | | | 0.961 | | 0.970 | 0.969 | 0.840 | |
| | | | | | 0.960 | | 0.900 | |
| K1-6 | K1-7 | K1-8 | K2-6 | K2-7 | K2-8 | K3-6 | K3-7 | |

AUTOMATED SURFACE DISTRESS MEASUREMENT SYSTEM

CROSS-REFERENCE TO RELATED APPLICATIONS

This application claims priority to U.S. Provisional Application Ser. No. 60/683,935, filed May 23, 2005, the contents of which is incorporated by reference herein in its entirety.

TECHNICAL FIELD OF THE INVENTION

The present invention relates generally to a surface distress measurement system, method and apparatus, and in particular, to a surface distress detection system to detect cracks in pavement using digital imaging to obtain and store data of the pavement crack in real time.

BACKGROUND OF THE INVENTION

Without limiting the scope of the invention, its background is described in connection with surface distress measurement system, method and apparatus, as an example.

Surfaces, e.g., such as pavement, roads, walkways, carriageways, parking lots, sidewalks and foundations, and the like are subject to heavy wear from traffic and/or environmental conditions. Over time, cracks cause the degradation of the pavement conditions and of the underlying surface. The increase in traffic on the nation's highways and the increasing weight of both commercial and individual vehicles has lead to an accelerated deterioration of the nation's road and highway infrastructure.

Pavement durability is affected by a number of factors, including: asphalt composition, construction techniques, number and speed of vehicles, overall weight and axle weight of vehicles that use the roadway, temperature and other environmental factors. Therefore, pavement conditions must be monitored to focus repairs on areas of greatest need. Furthermore, pavement conditions must be monitored so that a maintenance program may be established and areas prioritized based on need.

Many pavements, roads and parking lots were designed for low traffic volumes and have a thin bituminous surface. These surfaces are particularly susceptible to environmental conditions. For example, during wet weather, cracks in the surface of the pavement allow the force of traffic to inject water into the crack and under the pavement. Water under the pavement leads to erosion and eventually to failure of the pavement. Another related problem is the formation of frost heaves. In colder regions, the water under the pavement expands as it freezes and expands in the pavement creating a bump or "frost heave" that causes pavement failure. The detection of these cracks before they become extensive allows the sealing of the surface and in turn preserves pavement durability.

There are many other sources of pavement defects that affect the surface and serve as indicators of the general condition of the pavement. If these defects are detected early enough intervention to seal or repair them can be preformed before the defects develop into a more serious and expensive problems. Generally, when cracks reach a certain size remedial surface treatments are not effective therefore it is imperative that cracks are detected early and preferably when they are no larger than 1 mm. Another pavement defect is rutting, which is the result of surface deformation in the wheel path of the vehicle. Again, if these areas can be identified during the early stages preventive maintenance can be performed.

For reliable evaluation of the pavement conditions virtually every section of the road surface must be examined for crack, hairline cracks, holes and other defects that eventually lead to serious problems for vehicles. One method of evaluating the condition of the pavement is visual inspection of the pavement surface by skilled personnel, which is extremely labor intensive and suffer from the influence of human subjectivity. Therefore, the information obtained from the visual inspection of the pavement may not contain the detail necessary to accurately determine the condition of the pavement. Human evaluation of the conditions of the surface also leads to reproducibility problems for information on pavement cracking for common types of payment surfaces. Furthermore, for the visual inspection method is rate limited by the individual (e.g., time, speed, eyesight, environmental conditions and the like) and the very nature of this inspection exposes the individual to numerous traffic and safety hazards. Thus, it is virtually impossible for visual inspections of all sections of the roads in a particular municipality and/or region to gather, store, catalog and update the necessary crack data.

Automated measurement systems used to detect condition of the pavement include a video camera, which films the road surface at relatively high speeds. The video image is then processed to extrapolate data to determine the severity and extent of cracking. A computer evaluates the roughness profile and assessment of pavement surface condition, e.g., rutting, texture and cracking. Once cracks and/or defects reach a certain size, they are marked for repair. However, the current video systems are not without limitations. For example, these systems are prone to overlap and may also lack the definition necessary to evaluate the pavement surface for the initial stages of defect formation. Another problem associated with the detection of cracks in the surface is definition of the sensor when the image of the surface is large in comparison to the defect area, as the dimension of the defects may become of the order of a pixel or even smaller than a pixel. Therefore, the detection defects will become very difficult or highly random, particularly due to the analog-digital conversion that is necessary to process the image.

The automated measurement systems used to evaluate pavement conditions also include video logging to sensors (e.g., laser or ultrasound). However, these systems do not provide sufficient data relating to cracks. Many automated systems have limitations in their ability to discern cracks at the initial stages, in particular, they lack the ability to discern cracks on pavement surfaces from other structures and/or discern cracks from sealed areas on pavement surfaces. Furthermore, many systems are not functional at highway speeds, which is necessary for safety and efficient monitoring. Another limitation of the present automated measurement systems is the reliance on post processing of the data, which often is preformed manually and is susceptible to human error, reproducibility issues and is extremely labor intensive.

The foregoing problems have been recognized for many years and while numerous solutions have been proposed, none of them adequately address all of the problems in a single device, e.g., early detection of relatively small cracks in the early stage of formation, while reducing overlap and reliance on human judgment and improving resolution while allowing monitoring at highway speeds.

SUMMARY OF THE INVENTION

The present inventors recognized a need for automated measurement systems to evaluate the condition of pavement for early detection of relatively small cracks in the early stage of formation and to discern cracks on pavement surfaces from other structures and sealed areas on pavement surfaces, while allowing monitoring at highway speeds and reducing the reliance on human judgment.

In accordance with the present invention, a method, system and apparatus are provided that detects and measures surface distress to detect cracks and other defects in a surface (e.g., pavement, concert or similar surfaces) using digital imaging to obtain and store data concerning the crack condition of a pavement in real time. The present invention provides surface crack measurements at highway speeds, while eliminating many of the safety concerns associated with prior surface crack detection methods, systems and apparatuses.

For example, the present invention includes a system for determining surface conditions in real time. The system includes a real time digital imaging device positioned to capture one or more images of a surface and an image processing device that processes the one or more images to identify defects in the surface. The imaging processing device determines the intensity of one or more regions of the one or more images, compares the intensity of one of the one or more regions to the intensity of another of the one or more regions and designates the region as defective.

One embodiment of the system includes a real time digital imaging device having a line-scan camera and one IR laser line projectors. Another embodiment includes a real time digital imaging device having two line-scan cameras and four IR laser line projectors.

The present invention also includes a system for determining surface conditions in real time including a real time digital imaging device positioned relative to capture one or more images of a surface and an image processing device that processes the one or more images to identify defects in the surface, wherein the imaging processing device determines the intensity of one or more regions of the one or more images, compares the intensity of one of the one or more regions to the intensity of another of the one or more regions, and designates the region as defective. Some embodiments include a display device in communication with the image processing device to display the results.

The present invention provides a method of measuring the condition of a surface in real time by acquiring one or more images of the surface and processing the one or more images in real time to identify surface defects, wherein the processing includes determining the intensity of one or more regions of the one or more images, comparing the intensity of one of the one or more regions to the intensity of another of the one or more regions and designating the region as defective.

Another example includes a surface distress measurement apparatus for determining surface conditions in real time. The apparatus includes one or more cameras, two or more laser line projectors and/or one or more LED lights positioned on a vehicle relative to a surface to capture one or more images of the surface. In one embodiment the one or more cameras include 2 line-scan cameras and 4 IR laser line projectors.

The present invention also provides a system for real time capture and processing of pavement crack data including a vehicle capable of traveling at speeds up to about 70 miles per hour, a digital imager mounted in or on the vehicle for capturing one or more digital images of the surface and a processor in communication with the digital imager for processing at least part of the captured one or more digital images in real time, wherein the processor determines the intensity of one or more pixels of the one or more digital images, compares the intensity of one of the one or more pixels to the intensity of another of the one or more pixels and the comparison of intensities produces a pattern that is compared to a longitudinal template, a transverse template, a diagonal template or a combination thereof, wherein the comparison of the template to the pattern indicates the presence of cracking.

BRIEF DESCRIPTION OF THE DRAWINGS

For a more complete understanding of the features and advantages of the present invention, reference is now made to the detailed description of the invention along with the accompanying figures and in which:

FIG. 10a is an image of the pavement and 10b is a map of the cell;

FIG. 11a-11c illustrates tracing cracks from the seeds, verified seeds 11a, seed clusters 11b and traced cracks 11c;

FIG. 16 is a graph of the repeatability of the results with multiple scans during different environmental conditions where 16a is longitudinal cracks and 16b is transverse cracks;

FIG. 17 is a graph of the percent longitudinal cracking measured at different speeds;

FIGS. 25 and 26 are correlation coefficients of the displays cracking images in the absence of shadows and in the absence of shadows corresponding respectively;

DETAILED DESCRIPTION OF THE INVENTION

Figure 1:
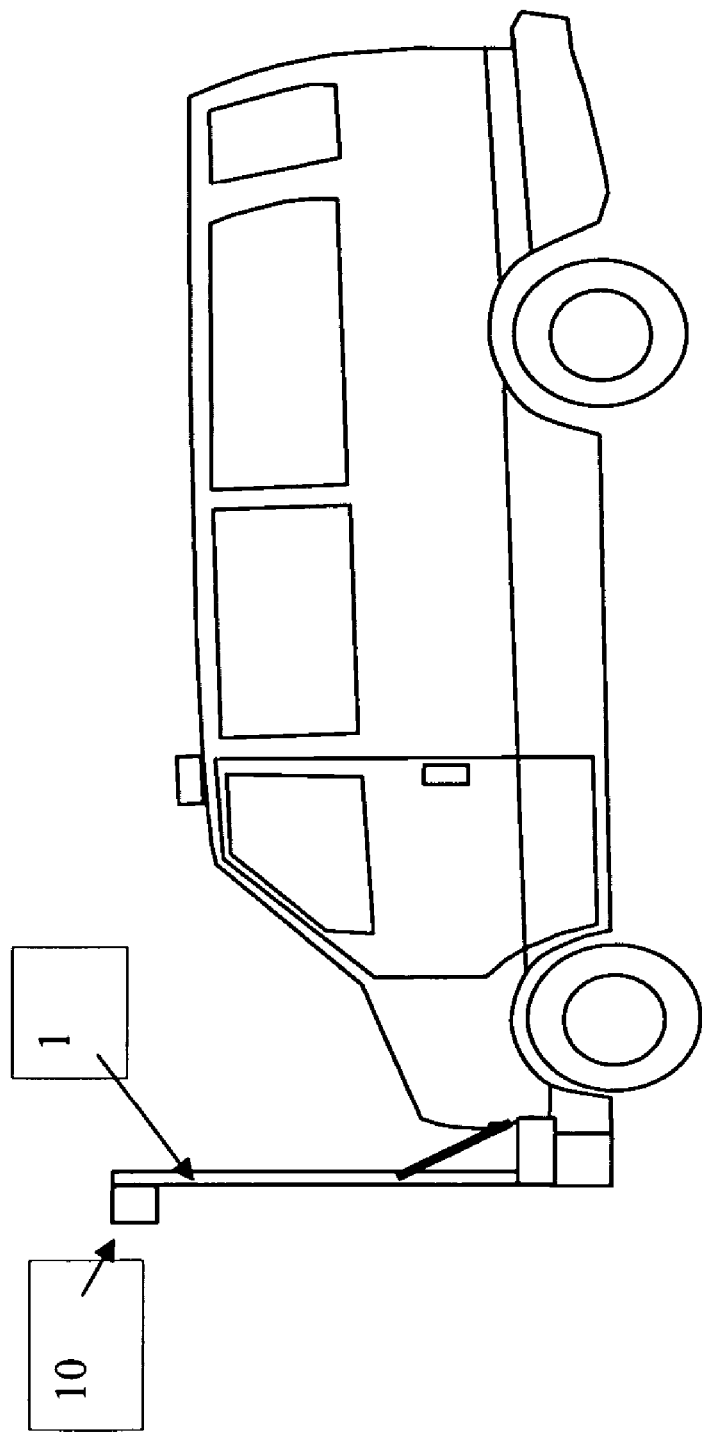
FIG. 1 illustrates an inspection vehicle equipped with the present invention.

While the making and using of various embodiments of the present invention are discussed in detail below, it should be appreciated that the present invention provides many applicable inventive concepts that can be embodied in a wide variety of specific contexts. The terminology used and specific embodiments discussed herein are merely illustrative of specific ways to make and use the invention and do not delimit the scope of the invention.

Pavement surface distresses are common failures of pavement constructions. Among them cracking is a major causes jeopardizing road serviceability and requires prompt surface rehabilitation. From early 1970's, researchers started to use digital imaging technology To develop automated pavement surface distress inspection (hereafter referred to as "APSDI") systems for pavement distress survey [1,3,4]. An APSDI system may reduce disturbance to the public traffic and road hazard to human inspectors during the survey. A true APSDI system needs to be able to detect thin cracking distress of 2 mm in width in various background textures while traveling at highway speed. Given the complexity of pavement conditions and textures, implementing such a system remains challenging.

The commercially available APSDI systems differ in their image acquisition devices. These devices include area-scan, linescan, and time delay integration (hereafter referred to as "TDI") linescan cameras. The camera may be a sensor, which could include a photodiode, charge coupled device (hereafter referred to as "CCD") or time delay integration (TDI) array of photosensitive elements. An area-scan camera grabs a frame of image at a time, and requires to be mounted to have a clear and perpendicular view of a rectangle area of the pavement and makes the system vulnerable to the vehicle vibration due to the long extension of the mounting device. It is also difficult to provide a uniform lighting to a large area under different weather conditions. The TDI technology integrates photo charges from multiple CCD line arrays. It is useful in the high-speed image acquisition where the exposure time is limited or when the illumination is low. However, a TDI camera is sensitive to the optical alignment to the target. The camera has to be mounted perfectly perpendicular to the surface of pavement. Vehicle vibration causes more blurriness of image with a TDI camera, especially at a high speed. Recent development on CCD technology not only dramatically increases the camera's resolution and line scan rate, but also greatly enhance the sensitivity of CCD sensors. One example, the Dalsa Piranha2 2048 pixel linescan camera can grab 44000 line images per second, and its sensitivity is high enough for get good quality images while moving 112 km/h (70 mph) without artificial lighting.

In accordance with the present invention, a method and apparatus are provided that allows detection and measurement of surface distress to detect cracks and other defects in a surface (e.g., landing strip, runway, track, pavement, roads, walkways, carriageways, parking lots, sidewalks and foundations, or similar surfaces) using digital imaging processing to obtaining and storing data concerning the pavement conditions in real time. The present invention provides for measuring surface cracks at highway speeds, while eliminating many of the safety concerns associated with prior surface crack detection methods, systems and apparatuses.

For example, the present invention includes a system for determining surface conditions in real time including a real time digital imaging device positioned relative to capture one or more images of a surface and an image processing device that processes the one or more images to identify defects in the surface, wherein the imaging processing device determines the intensity of one or more regions of the one or more images, compares the intensity of one of the one or more regions to the intensity of another of the one or more regions, and designates the region as defective. Some embodiments include a display device in communication with the image processing device to display the results.

In some embodiments, the system is connected to a vehicle. The vehicle can be a car, a truck, a van, a bus, a SUV, an ATV, a four-wheeler, a trailer, a sled, a wagon, a cart or a combination thereof. The surface may be asphalt, sprayed seal, concrete or similar material or a combination thereof. The vehicle may travel at speeds about the posted speed limit or at speeds adequate to produce images of good readable quality. In some instances, the vehicle travels at speeds up to about 80 miles per hour. The system can adjust the capture rate so that the digital imaging device captures one or more images of the surface as the vehicle moves. In some instances, the digital imaging device acquires one image for about every millimeter of relative movement. In other embodiments, the number of images and/or the number of millimeters of relative movement can be adjusted.

For example, the image processing device of the present invention is designed to perform a variety of functions including changing the format the one or more images, adding a label the one or more images and processing the one or more images. In some instances, the labels relate to a specific location that the image was acquired, so that the geographical location and the image can be reconciled. Each of the one or more regions may correspond to one or more pixels depending on the needs of the specific application. The region can be a grid of between about 1 and 100 pixels and about 1 and 100 pixels. In one embodiment, the grid is 8 pixels by 8 pixels. The intensity of the one or more regions discern a pattern that may be compared to a longitudinal template, a transverse template, a diagonal template, a custom template or a combination thereof, wherein the comparison of the template to the pattern indicates the presence of a defect. In some instances, the template includes six regions; however, other templates may have more or less regions. Some examples of templates include a longitudinal template, a transverse template, a diagonal template or a combination thereof, wherein the comparison of the template to the region indicates the presence of a defect. The template is compared to the image to identify a transverse crack; a longitudinal crack; diagonal crack, a multi-dimensional crack, a non-cracked feature or a combination thereof. In another embodiment, the intensity of the one or more regions is compared to a longitudinal template, a transverse template, a diagonal template and a combination thereof, wherein the comparison of the template to the region indicates the presence of defects. Furthermore, in some instances the image processing device adjusts the acquisition timing of the digital imaging device in relation to the reflectivity of the surface, the speed at which the digital imaging device is moving relative to the surface or a combination thereof.

The digital imaging device may include a photodiode, charge coupled device, time delay integration device, array of charge coupled devices, time delay integration array of photosensitive elements or a combination thereof. Furthermore, the digital imaging device includes a sensor that detects, electromagnetic radiation, laser, UV wavelengths, IR wavelengths, near IR wavelengths, visible wavelengths, sound waves, magnetic fields, radar signals thermal variations and combinations thereof. In addition to one or more digital imaging devices the present invention may have one or more Global Positioning Systems, road location reference systems, lights, imagers, wireless network adaptors, Ethernet adaptors, modems, computers, cameras, sensors or a combination thereof in communication with the image processing device. Further additions include a light source; apparatus for controlling the intensity and direction of light according to the level of exposure required by the digital imaging device and optionally one or more reflectors that concentrate the light emitted from the light source on an area of the surface.

Another example, is a surface distress measurement apparatus to determine surface conditions in real time including a real time digital imaging device positioned relative to capture one or more images of a surface and an image processing device that processes the one or more images to identify defects in the surface, wherein the imaging processing device determines the intensity of one or more regions of the one or more images, compares the intensity of one of the one or more regions to the intensity of another of the one or more regions, and designates the region as defective. Some embodiments include a display device in communication with the image processing device to display the results.

For example, the image processing device of the present invention is designed to perform a variety of functions including formatting the one or more images, labeling the one or more images and processing the one or more images. In some instances, the labels relate to a specific location that the image was acquired, so that the geographical location and the image can be reconciled. Each of the one or more regions may correspond to one or more pixels depending on the needs of the specific application. The region can be a grid of between about 1 and 100 pixels and about 1 and 100 pixels. In one embodiment the grid is 8 pixels by 8 pixels. The intensity of the one or more regions discern a pattern that may be compared to a longitudinal template, a transverse template, a diagonal template, a custom template or a combination thereof, wherein the comparison of the template to the pattern indicates the presence of a defect.

In some instances, the template includes six regions; however, other templates may have more or less regions. Some examples of templates include a longitudinal template, a transverse template, a diagonal template or a combination thereof, wherein the comparison of the template to the region indicates the presence of a defect. The template is compared to the image to identify a transverse crack; a longitudinal crack; diagonal crack, a multi-dimensional crack, a non-cracked feature or a combination thereof. In another embodiment, the intensity of the one or more regions is compared to a longitudinal template, a transverse template, a diagonal template and a combination thereof, wherein the comparison of the template to the region indicates the presence of defects. Furthermore, the image processing device adjusts the acquisition timing of the digital imaging device in relation to the reflectivity of the surface, the speed at which the digital imaging device is moving relative to the surface or a combination thereof.

The intensity of the one or more regions displays a pattern and the pattern may be compared a longitudinal template, transverse template, diagonal template or a combination thereof, wherein the comparison of the template to the pattern indicates the presence of cracking. In some instances, the templates include six regions; however, other templates may have more or less regions. Some examples of templates include a longitudinal template, transverse template, diagonal template and combinations thereof, wherein the comparison of the template to the region indicates the presence of cracking. The template comparison allows the image to be identified as a transverse crack; a longitudinal crack; diagonal crack, a multi-dimensional crack, a non-cracked feature or a combination thereof. In another embodiment, the algorithm compares the intensity of the one or more regions to a longitudinal template, transverse template, diagonal template and combinations thereof, wherein the comparison of the template to the region indicates the presence of cracking. Furthermore, in some instances the image processing device adjusts the acquisition timing of the digital imaging device in relation to the reflectivity of the surface, adjusts the acquisition timing of the digital imaging device in relation to the speed at which the digital imaging device is moving relative to the surface or a combination thereof.

The digital imaging device may include a photodiode, charge coupled device, time delay integration device, array of charge coupled devices, time delay integration array of photosensitive elements or a combination thereof. Furthermore, the digital imaging device includes a sensor that detects, electromagnetic radiation, laser, UV wavelengths, IR wavelengths, near IR wavelengths, visible wavelengths, sound waves, magnetic fields, radar signals thermal variations and combinations thereof. In addition to one or more digital imaging devices the present invention may have one or more Global Positioning Systems, distance measurement systems, road location reference systems, lights, imagers, wireless network adaptors, LEDs, lasers, Ethernet adaptors, modems, computers, cameras, sensors or a combination thereof in communication with the image processing device. Further additions include a light source; apparatus for controlling the intensity and direction of light according to the level of exposure required by the digital imaging device and optionally one or more reflectors that concentrate the light emitted from the light source on an area of the surface.

The present invention provides a method of measuring the condition of a surface in real time by acquiring one or more images of the surface and processing the one or more images in real time to identify surface defects, wherein the processing includes determining the intensity of one or more regions of the one or more images, comparing the intensity of one of the one or more regions to the intensity of another of the one or more regions and designating the region as defective.

For example, the image processing is designed to perform a variety of functions including formatting the one or more images, labeling the one or more images and processing the one or more images. In some instances, the labels relate to a specific location that the image was acquired, so that the geographical location and the image can be reconciled. Each of the one or more regions may correspond to one or more pixels depending on the needs of the specific application. The region can be a grid of between about 1 and 100 pixels and about 1 and 100 pixels. In one embodiment, the grid is 8 pixels by 8 pixels. The intensity of the one or more regions discern a pattern that may be compared to a longitudinal template, a transverse template, a diagonal template, a custom template or a combination thereof, wherein the comparison of the template to the pattern indicates the presence of a defect. In some instances, the template includes six regions; however, other templates may have more or less regions. Some examples of templates include a longitudinal template, a transverse template, a diagonal template or a combination thereof, wherein the comparison of the template to the region indicates the presence of a defect. The template is compared to the image to identify a transverse crack; a longitudinal crack; diagonal crack, a multi-dimensional crack, a non-cracked feature or a combination thereof. In another embodiment, the intensity of the one or more regions is compared to a longitudinal template, a transverse template, a diagonal template and a combination thereof, wherein the comparison of the template to the region indicates the presence of defects. Furthermore, in some instances the image processing device adjusts the acquisition timing of the digital imaging device in relation to the reflectivity of the surface, the speed at which the digital imaging device is moving relative to the surface or a combination thereof.

The one or more images of the surface may be from a photodiode, charge coupled device, time delay integration device, array of charge coupled devices, time delay integration array of photosensitive elements or a combination thereof. Furthermore, the one or more images of the surface may be from a sensor that detects, electromagnetic radiation, UV wavelengths, IR wavelengths, near IR wavelengths, visible wavelengths, sound waves, laser, magnetic fields, radar signals thermal variations and combinations thereof. In addition the present invention may processes information form or control one or more Global Positioning Systems, road location reference systems, lights, imagers, wireless network adaptors, Ethernet adaptors, modems, computers, cameras, sensors or a combination thereof in communication with the image processing device. Further additions include a light source and provide for controlling the intensity and direction of light according to the level of exposure required by the digital imaging device and optionally one or more reflectors that concentrate the light emitted from the light source on an area of the surface.

The present invention also provides a system for real time capture and processing of pavement crack data including a vehicle capable of traveling at speeds up to about 80 miles per hour, a digital imager mounted in or on the vehicle for capturing one or more digital images of the surface and a processor in communication with the digital imager for processing at least part of the captured one or more digital images in real time, wherein the processor determines the intensity of one or more pixels of the one or more digital images, compares the intensity of one of the one or more pixels to the intensity of another of the one or more pixels and the comparison of intensities produces a pattern and the pattern is compared a longitudinal template, transverse template, diagonal template or a combination thereof, wherein the comparison of the template to the pattern indicates the presence of cracking.

The present invention includes a system for determining surface conditions in real time. The system includes a real time digital imaging device positioned to capture one or more images of a surface and an image processing device that processes the one or more images to identify defects in the surface. The imaging processing device determines the intensity of one or more regions of the one or more images, compares the intensity of one of the one or more regions to the intensity of another of the one or more regions and designates the region as defective.

One embodiment of the system includes a real time digital imaging device having a line-scan camera and two IR laser line projectors. Another embodiment includes a real time digital imaging device having two line-scan cameras and four IR laser line projectors.

Another example includes a surface distress measurement apparatus for determining surface conditions in real time. The apparatus includes one or more cameras and two or more laser line projectors positioned on a vehicle relative to a surface to capture one or more images of the surface. In one embodiment the one or more cameras include 2 line-scan cameras and 4 IR laser line projectors.

The image processing technique of the present invention includes a processing speed that allows effective image processing algorithm for real-time crack detection. For example, if the image size is 2048×512 pixels covering a pavement area of 3.05×0.76 m$^2$ (10×2.5 ft$^2$) and the vehicle speed is 112 km/h (70 mph), the computer has only 24.35 ms to acquire and process an image. Therefore, many existing systems use an offline approach to extract data from grabbed images. The offline processing, however, provides no real-time data on site, and it requires additional work and equipment for the post processing. A recent study conducted by the Naval Facilities Engineering Service Center concluded that an offline APSDI system and the manual survey provided consistence pavement condition index (PCI) measurements, and the costs of both surveys were at the same level [5]. Many offline image processing techniques such as digital filter, adaptive threshold, and expert system can be readily found in the literatures [6,7,8]. In 1998, the CSIRO Manufacturing Science & Technology, Australian, developed an automated pavement surface inspection system, RoadCrack, which can be operated at a vehicle speed up to 105 km/h while processes images in real time. The system uses four CCD cameras to grab images of a 500 mm wide wheel path with a 1 mm resolution. Although it was the first fully functional online APSDI system, RoadCrack guaranties only a minimum of 10% distance coverage.

The present inventors develop an APSDI system of the present invention designed to run at a vehicle speed ranging from 5 to 112 km/h (3 to 70 mph), to characterize cracking distress in real time and report the data via a local network to the database at a given distance interval. In some embodiments the data format may be compatible with both the Texas pavement management information system (hereafter referred to as "PMIS") protocol and the AASHTO (hereafter referred to as "American Association of State Highway Transportation Officials") protocol. The system also provides full width of pavement (3.05 m) and 100% of the pavement in traveling distance.

With reference to FIG. 1 a surface distress measurement system 1 of the present invention equipped on a pavement inspection vehicle. The surface distress measurement system 1 includes a camera 10, a frame grabber (not shown) and a processor (not shown). Optionally included in the surface distress measurement system 1 is a memory system, an external storage device, additional lighting, a network interface (not shown) capable of connecting to other network system (e.g., vehicle and remote location). Persons of skill in the art will recognize that the network system may take a variety of configurations. For example, the network interface may relay the signal to another station which in turn communicates with a remote location, the network interface may directly communicate with the remote location, the network interface may communicate with other vehicles and combinations of these configurations may also be used. The network interface (not shown) may be of different designs and communicate the wired or wireless protocols. The camera 10 may be mounted in a waterproof enclosure (not shown).

The present invention may be integrated into or onto a vehicle having wherein the hardware including a camera 10 is set at a predetermined distance from a road pavement surface, a trigger mechanism, a mechanism for generating power and a light source for illumination of the surface to be imaged. The vehicle may be a truck, a car, a bus, a van, a cart, a go-cart or land vehicle and other suitable vehicles. The vehicle may have integrated hardware with the components hardwired into the vehicle; however the present invention may be mounted removably with in the vehicle to allow ease of transport and repair. The present invention may be mounted to the vehicle so that it is positioned a specific distance from the surface. In addition, the mounting may include vibration dampening materials or devices. Other embodiments include fore and aft surface distress measurement systems of similar and different types.

Figure 2:
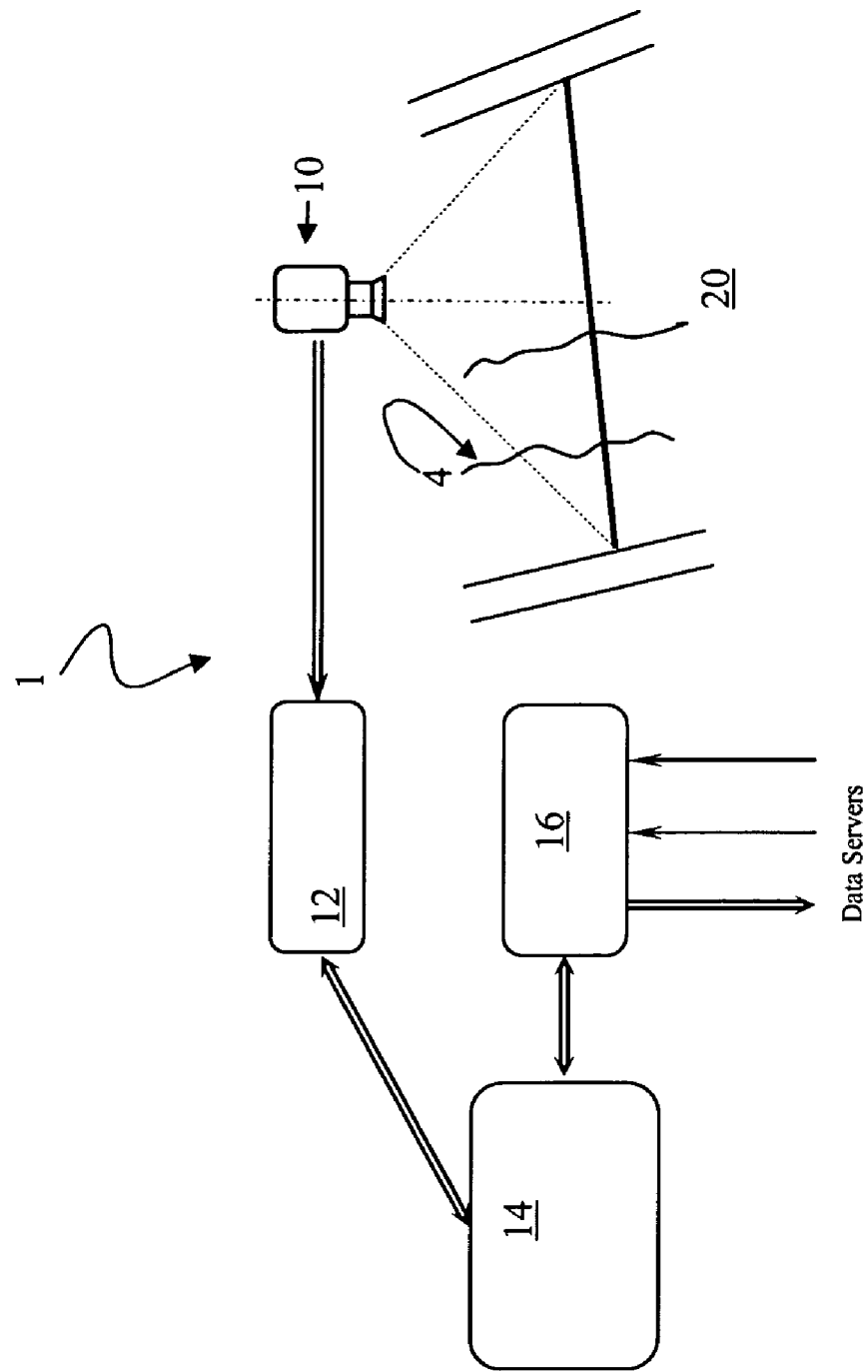
FIG. 2 illustrates certain features of a surface distress measurement system according to an embodiment of the present invention.

Now referring to FIG. 2, which illustrates certain features of a surface distress measurement system 1 according to one embodiment of the present invention that includes a CCD camera 10, a frame grabber 12 and a processor 14 and a network interface 16 to monitor surface 18 having cracks 20. For example, the camera 10 may be a Dalsa Piranha 2 camera or a Gig E Spider 3 camera that has a linear array of 2048 pixels; however, the skilled artisan will recognize that this is but one camera that can be used with the present invention. When the camera 10 covers 3.05 m in width, it has a ground resolution of 1.488 mm/pixel; however, other coverage widths and pixel dimensions may be used in certain applications. The camera 10 captures a line image at a time and sends individual lines to the frame grabber 12 through a high-speed Camlink interface or a Gig E interface. Once 512 lines, covering about 0.76 mm (2.5 feet) in distance, are accumulated on the board, an image of 2048×512 pixels is transferred to the main memory of the computer. The cumulative lines per image can be set to a different number. The line scan rate of the camera is calculated based on the traveling speed, and dynamically adjusted by the computer through Camlink's communication port. The rate must be synchronized with the vehicle speed to ensure that each line covers exactly the same distance on the pavement. The exposure time of the CCD array is also controlled for each scan through the communication port. The brightness of the current image can be used to calculate a reasonable exposure time for the next scan to avoid an over or under exposed image. It takes about 5 milliseconds to transfer this 8-bit grayscale image from the frame grabber to the system memory, leaving only less than 20 ms for the image processing when the vehicle travels at the speed of 112 km/h. The present invention can communicate to the other inspection modules on the vehicle through a local network. The system can support multiple data clients during run time and accepts external GPS and time data from other modules for the system synchronization.

The surface distress measurement system 1 of the present invention may include one or more cameras for example, camera 10, a frame grabber 12 and a processor 16 that may be in the form of a computer. When in the form of a computer the surface distress measurement system 1 may contain a storage medium on which software reside, e.g., processing algorithm, operating system and the like. The system includes a user interface (e.g., LCD screen/touch screen, keyboard, mouse, monitor or a combination thereof), which allows the user to control the system remote from the host and processing computers. The computer may manage the interface between the digital imaging device and at least one computer to manage the manner in which the digital imaging device acquires images and to manage the way in which the acquired data is passed on to an image processing CPU. The computer may control many features of the process including the system start up, initialization and control parameters, communication with the camera interface and data distributor interpretation of commands, communication with the user interface computer interpretation of commands, user interface to set up, control and diagnose system instrumentation, image and data acquisition and processing, frame grabber control, manage the distribution of image data processing load between parallel operating image processing computers, apply the appropriate image processing algorithms to the image data, merge frame information with processing results and generate output data file, establish communications with a remote location, transfer information to a remote location, initiate remote system control and a combination thereof.

The surface distress measurement system 1 may implement a variety of software components including control of system start up, initialization and control parameters, communication with the camera interface and data distributor, interpretation of commands, communication with the user interface, user interface to set up, control and diagnose system instrumentation, image and data acquisition and processing, frame grabber control, manage the distribution of image data processing load between one or more image processing computers, apply the appropriate image processing algorithms to the image data, merge frame information with processing results, display output files and generate output data file.

Figure 3:
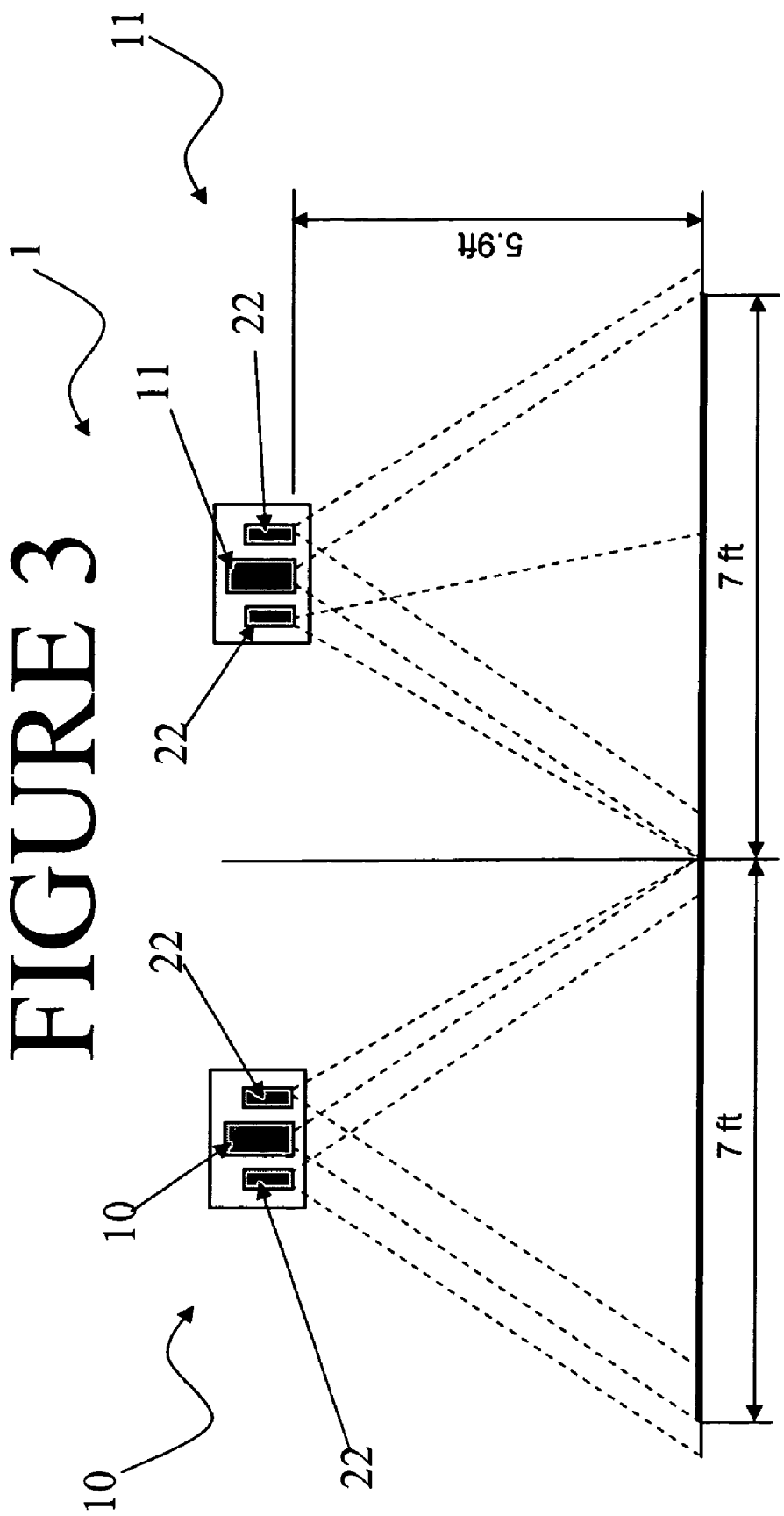
FIG. 3 illustrates one embodiment of a dual camera setup of the present invention.

FIG. 3 is one embodiment of a dual camera setup of the present invention. The surface distress measurement system 1 is attached to a vehicle (not shown) so that the first camera unit 10 and the second camera 11 are positioned about 6 feet apart; however, this distance may vary depending on the application and vehicle. The surface distress measurement system 1 is mounted about 5.9 feet from the surface of the road, again the skilled artisan will know that this distance may vary depending on the application and vehicle. The first camera unit 10 includes two laser line projectors 22 positioned about each side of the camera 10 to perform real-time survey record of the images. The second camera 11 includes two laser line projectors 22 positioned about each side of the camera 11 to perform real-time survey record of the images. The total for a two camera system (e.g., 10 and 11) includes two cameras 10 and 11 and four laser line projectors 13 to perform real-time survey on an area about 12 feet. The surface distress measurement system 1 set at this height allows a 12-foot wide lane of pavement to be recorded with 0.89 mm/pixel resolution at speeds from about 3 to about 70 mph. In one example, the cameras 10 and 11 are 2 k linescan cameras, although the skilled artisan will recognize that the type and specifications of the camera may vary. The laser line projectors 22 are IR laser line projectors, although the skilled artisan will recognize that the type and specifications of the camera may vary.

Figure 4:
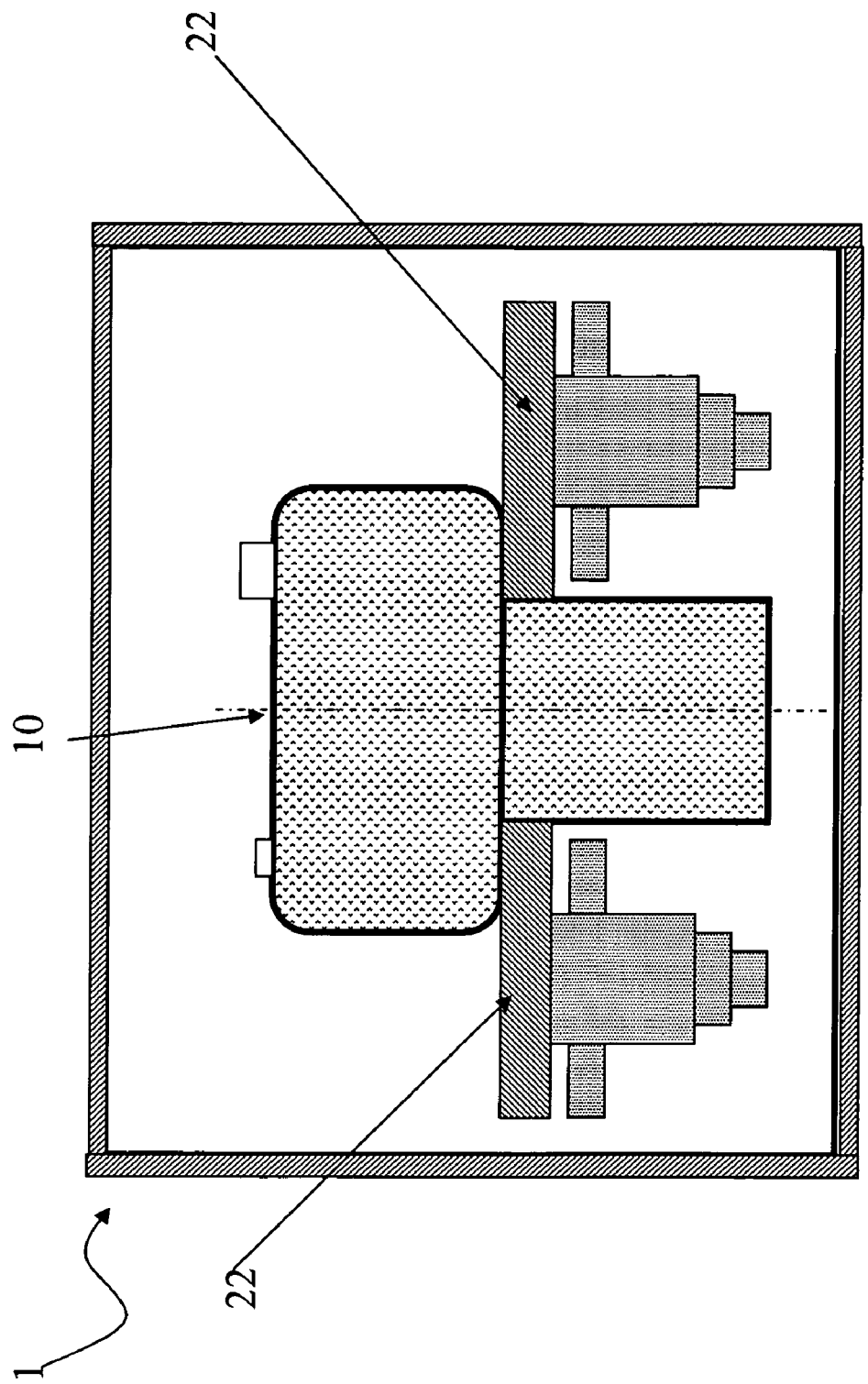
FIG. 4 illustrates a cutaway image of a surface distress measurement system that includes a camera unit having two laser line projectors positioned about each side of the camera.

FIG. 4 is a cutaway image of a surface distress measurement system 1 that includes a camera unit 10 having two laser line projectors 22 positioned about each side of the camera 10 to perform real-time survey record of the images. The camera unit 10 includes a 2 k line-scan camera to cover about a 6-foot wide segment of pavement that improves the resolution to 0.89 mm/pixel. In addition, the camera unit 10 may be fitted with a variety of different lenses and filters, e.g., a 20 mm F-mount lens and an IR band-pass filter, e.g., 82 mm IR87. The also includes two laser line projectors 22 wherein each laser line projectors 22 is a one watt IR (808 nm) laser line projectors, which consume lower electrical power than other lighting devices.

Figure 5:
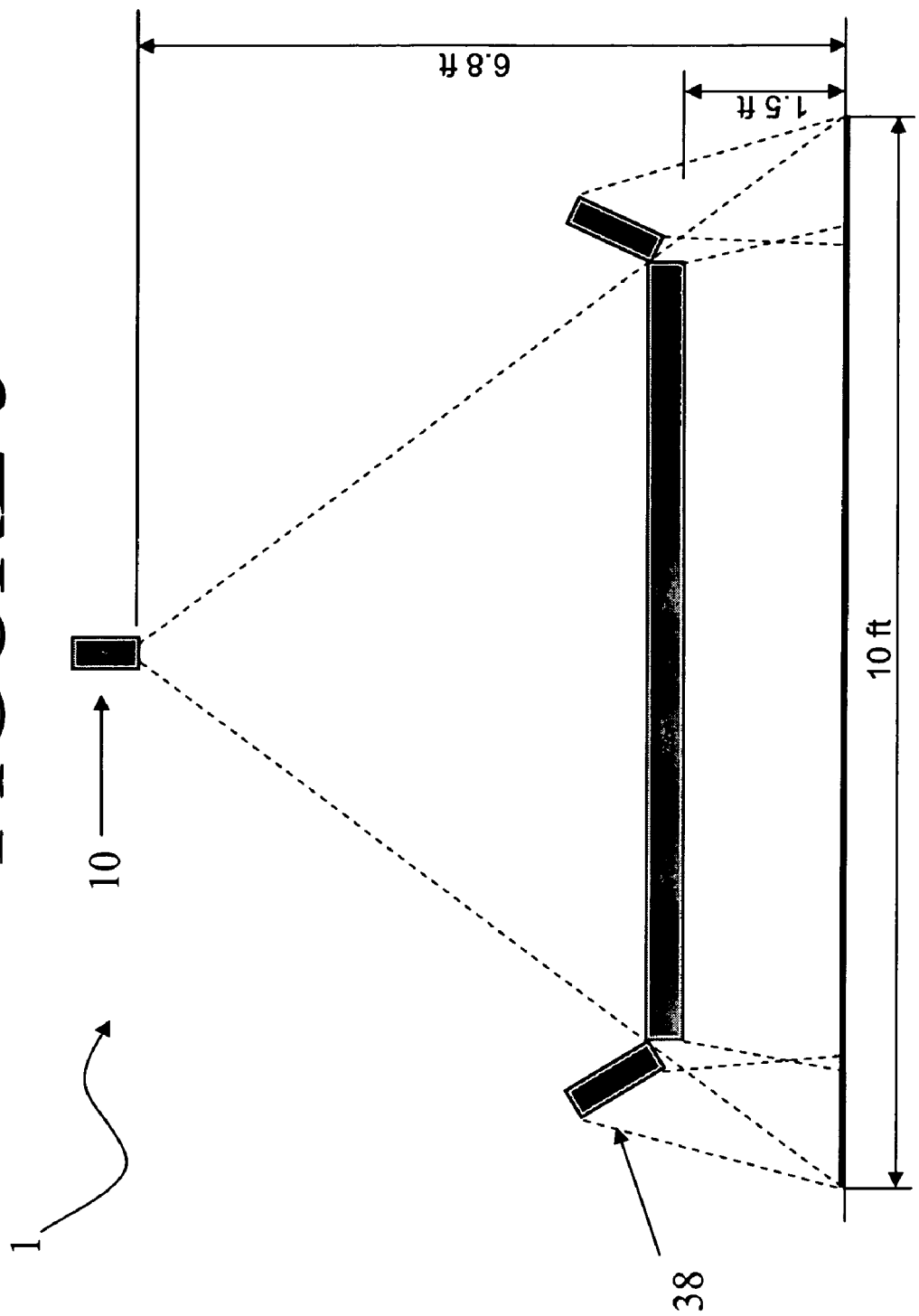
FIG. 5 illustrates a surface distress measurement system having a single camera unit and light bar.

FIG. 5 is an illustration of the surface distress measurement system 1 including a single camera 10 and light bar 38. The light bar 38 is attached to the vehicle (not shown) at a specific distance from the single camera 10 to provide light for the imaging. The single camera 10 may be any camera known to the skilled artisan; one example includes a 2 k line scan camera with a 14 mm F-mount lens and a led light band pass filter. The light bar 38 may be configured in a variety of manners, e.g., one 6-foot central bar and two wing sections. The camera 10 may be a 2 k linescan camera and a LED linear light bar 38 to perform real-time survey on a 10-foot wide lane of pavement with 1.48 mm/pixel resolution at speeds from 3 to 70 mph.

Figure 6:
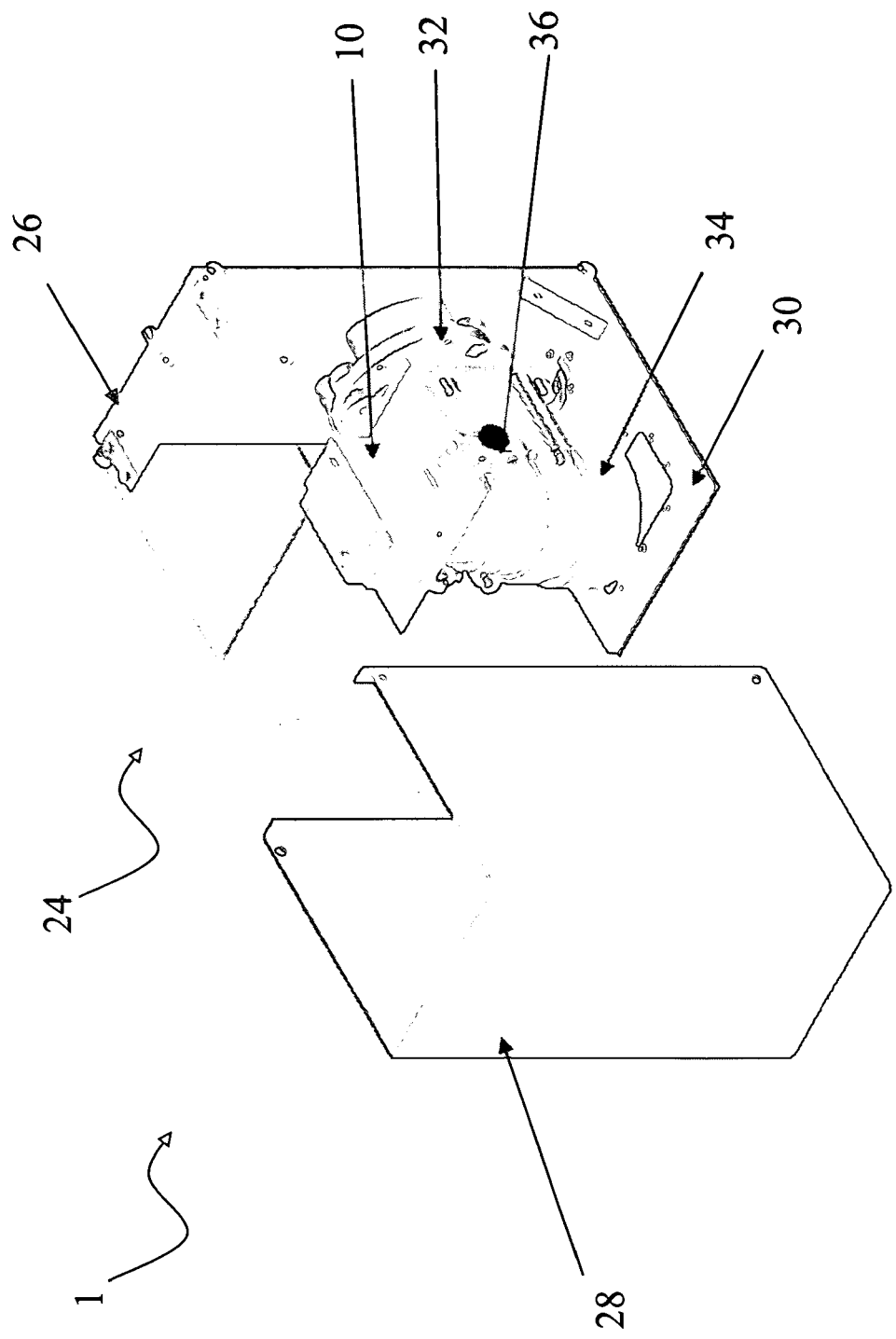
FIG. 6 illustrates is an image of a surface distress measurement system that includes a single camera unit.

FIG. 6 is an image of a surface distress measurement system 1 that includes a camera unit. The surface distress measurement system 1 is housed in a mounting assembly 24 that is attached to a vehicle (not shown). The mounting assembly 24 includes back plate 26, front cover 28 and base 30 to protect the internal components from the external environment. A camera 10 (e.g., line scan camera) is mounted to a tilting mount 32 that accommodates the movement of the camera 10. The camera 10 may include a lens 34 that may be interchanged depending on the particular specification necessary. A laser or laser pointer 36 may also be attached to the mounting assembly 24. The laser pointer 36 may be useful when an IR laser is used to determine coverage and focus. In addition, a filter (not shown) may be adapted to reduce interference. In one example, the camera 10 is a line scan camera fitter with a 14 mm F-mount lens, a laser pointer and a 610 nm band-pass filter.

Figure 7:
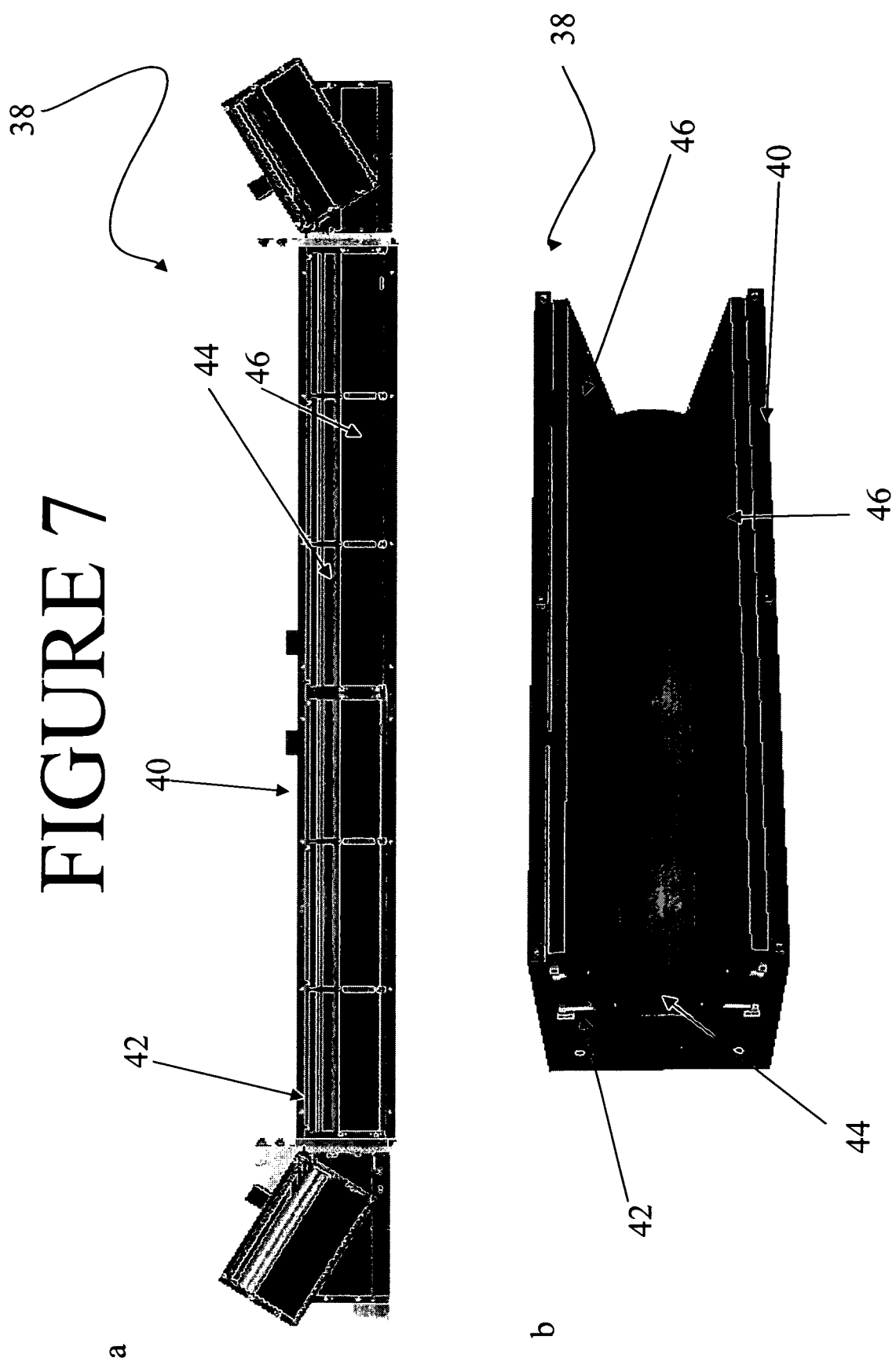
FIGS. 7a, 7b and 7c are illustrations one embodiment of the light bar of the present invention.
Figure 7:
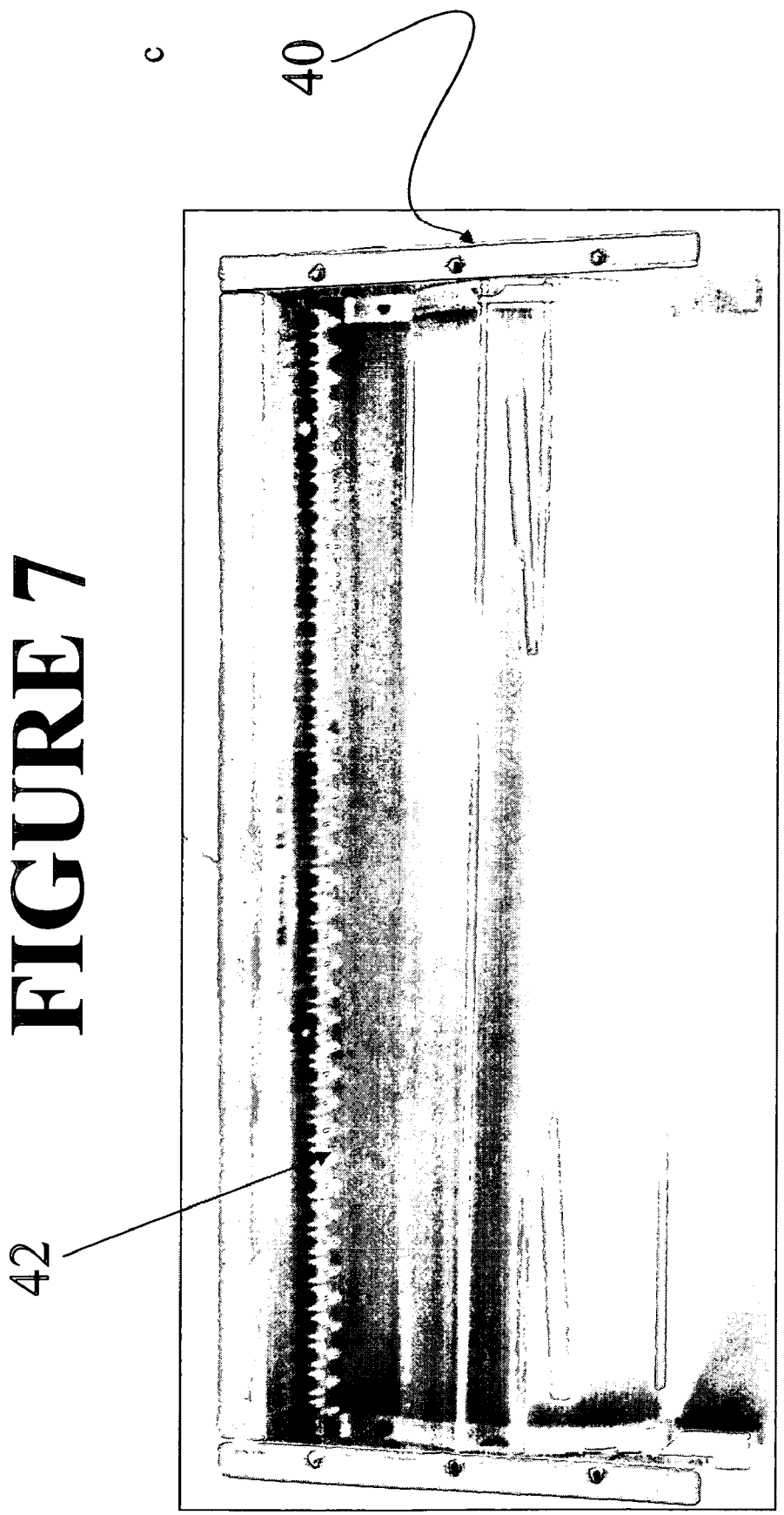

FIGS. 7a and 7b are illustrations one embodiment of the light bar 38 of the present invention. The light bar 38 includes LED arrays having a frame 40 with one or more LEDs 42, e.g., arranged in 3 rows of 40 LEDs. Other embodiments may include multiple LED arrays positioned to illuminate the surface. The LEDs 42 are on a printed circuit board (not shown). In one example, every row has 40 LEDs. The light bar 38 includes a lens 44, (e.g., a cylindrical lens) to converge the light of the LEDs 42 on the same row into a narrow beam along the axis. The mirror 46 is positioned and used to redirect the two side beams to be merged with the central beam for higher intensity. FIG. 7c is a photograph of the light bar 38 includes an LED array having a frame 40 with one or more LEDs 42, e.g., arranged in 3 rows of 40 LEDs.

In one example, the LED light bar 38 is specially designed lighting device for the automated pavement distress measurement system (e.g., CrackScope). The basic function of this device is to provide intense, uniform, and linear illumination for the CrackScope's line-scan camera 10 and helps it capture high quality pavement images under any ambient lighting conditions. The LED light bar 38 includes a 6-foot long central unit and two one-foot long wing units. Each unit utilizes three rows of red LED's 42, a cylindrical lens 44 and two mirrors 46, forming a one-inch wide beam at a distance 16-inch. The energy consumption of the light bar is less than about 250 watts, eliminating the need for an additional generator. Along with a matching band pass filter, the light bar 38 enables the camera to avoid the variations of the ambient light. The lighting intensity is sufficient enough for nighttime surveys. The wing assemblies of the light bar can be knocked off should they collide with a foreign object. The light bar is eye-safe, durable and easy to maintain. The light bar 38 greatly improves the repeatability and accuracy of the measurement data.

The image acquisition camera 10 may be a CCD camera but other embodiments may include a photodiode, charge coupled device array (CCD), time delay integration (TDI) array of photosensitive elements or a combination thereof. The camera 10 may be arranged transverse to the vehicle direction of travel. The camera 10, the frame grabber 12 and the processor 16 may be intergraded in a single or multiple units in communication with each other and allow the camera 10 to record a meter of roadway per meter of longitudinal vehicle movement. The number of pixels (e.g., light sensitive elements) can be selected depending on the requirements of the specific location, e.g., width of roadway to be inspected, resolution necessary and the like. The camera 10 may also include a mechanism to account for the light reflection of the pavement surface, e.g., filters.

Although some embodiments of the present invention do not need illumination; illumination may be added or necessary under certain circumstances to achieve the desired contrast between the crack and road surface (e.g., night, Overcast, sunny conditions, etc.). When additional illumination is needed a variety of sources may be used including halogen lighting, sodium lighting, quartz iodine lighting and other sources known in the art. The illumination may be focused and/or adjusted to provide the desired width of even light distribution.

One external illumination source includes a semi-conductor based light emitting diodes and laser diodes (herein after both are generally referred to as LED). LEDs as an illumination source have numerous advantages including: high efficiency, small size, low heat generation so that the influence of heat on the system can be reduced, can emit bright color light and longer bulb life. Also, LEDs have excellent initial driving characteristics and vibration resistance. Furthermore, it can withstand repeated ON/OFF cycling. Additionally, the LEDs may be arranged in one or more array banks, the number of array banks may be increased or decreased as needed to achieve the desired illumination under different environmental conditions. The number and arrangement of the LEDs in the array can be changed to alter the distribution characteristics of the illumination of the surface. Furthermore, the type, number, emission wavelength and the ratios thereof can be modified to suite a specific illumination need.

The type of LED is not limited to a particular type, shape or color, but the desired color and the desired type (e.g., such as chip type and red color) of LEDs may be selected depending on the needs of the particular application. In addition, different kinds of LEDs may be used in combination to achieve the desired illumination pattern. The number of LEDs used may be determined in comprehensive consideration of the light quantity of the LED light source, the luminance of light to be radiated outward, the desired wavelength to be emitted and so on.

Suitable choice of the light-emitting diodes of LED arrays permits the wavelength of the light directed onto the surface to be optimally coordinated with the external conditions. The best possible contrast can therefore be obtained, camera filters can be used, uniformed illumination over the surface, specific dimensions may be illuminated and so on may be achieved with the LED arrays.

The light source unit is constituted by LEDs, substrates to be mounted with the LEDs respectively, and wires for supplying electric power to the LEDs. The LED semiconductor body or bodies may contain GaN, InGaN, AlGaN, ZnS, InAlGaN, ZnSe, CdZnS, or CdZnSe semiconductor material and emit visible light or infrared or ultraviolet electromagnetic radiation. The present invention is not limited to the LED semiconductor compositions disclosed herein, as the skilled artisan will recognize that other LEDs compositions may be used to produce the desired illumination.

The present invention also provides an illumination device to provide external illumination of the surface for improved data uniformity, repeatability and accuracy. The illumination device has one or more light emitting diodes (LEDs) positioned to illuminate the surface. In some instances, the LEDs are placed into one or more rows to provide illumination. The LEDs can be arranged into arrays for some applications and the arrays can be grouped to form larger arrays to illuminate the surface. The exact dimensions of the beam can be adjusted by the number, position and arrangement of the LEDs. For example, the beam may be between about 1-2 inches wide and between about 10 to 12 inches long, wherein the sized of the beam accommodates the movement of the beam resulting from road vibration and environmental conditions. In other (e.g., harsher) conditions the length and/or the width of the beam may be larger to compensate for the conditions. In one specific example, a 3 row 40 LED array is used to provide illumination for the surface. In some instances a vehicle may have about 8-10 LED arrays located on the vehicle, while other instances may have more or less LED arrays. Another advantage of the present invention is that the may be used during the day time and the night time. Additionally, filters may be added to the camera to interact with (e.g., block, enhance, etc) illumination. For example, one embodiment of the present invention includes LEDs that transmits light at a peak wavelength at about 610 nm. Other embodiments include a filter to enhance the contrast, reduce the extraneous light, filter the sunlight and combinations thereof.

The present invention provides for an external illumination source, wherein the external illumination source includes one or more LEDs in communication with a mounting base and positioned to emit relative to the one or more images and in electrical communication with a power source. One or more LEDs in electrical communication with a mounting base, positioned to illuminate at least a portion of the surface to be imaged. The mounting base may be positioned to illuminate the surface or a portion of the surface. Furthermore, multiple mounting bases may be used to form arrays. The arrays may be of similar or different color, type, intensity and so on. The mounting base may have any number of LEDs in any arrangement; however in one embodiment the LEDs may be arranged in equally spaced intervals. In some embodiments, the mounting base may have a heat sink whereby heat transfer is provided from the LEDs to the mounting base. Furthermore, the mounting base may have an opposite first and second surfaces and a heat sink extending along the length of the mountain base. The mounting base may also have at least one right printed wire board segment, left printed wire board segment separate from said right printed wire board segment with each LED of the plurality having a cathode lead attached to one of the at least one right printed wire board segment and the at least one left printed wire board segment, and each LED of the plurality having an anode lead attached to the other of the at least one right printed wire board segment and the at least one left printed wire board segment. In addition a supporting member may be attached to the mounting base to attach the mounting base to the system. In some embodiments, a window and/or one or more filters may be positioned between the LEDs and the surface. Furthermore, the device may have one or more interior channels for cooling the source and/or housing electrical wires.

Figure 8:
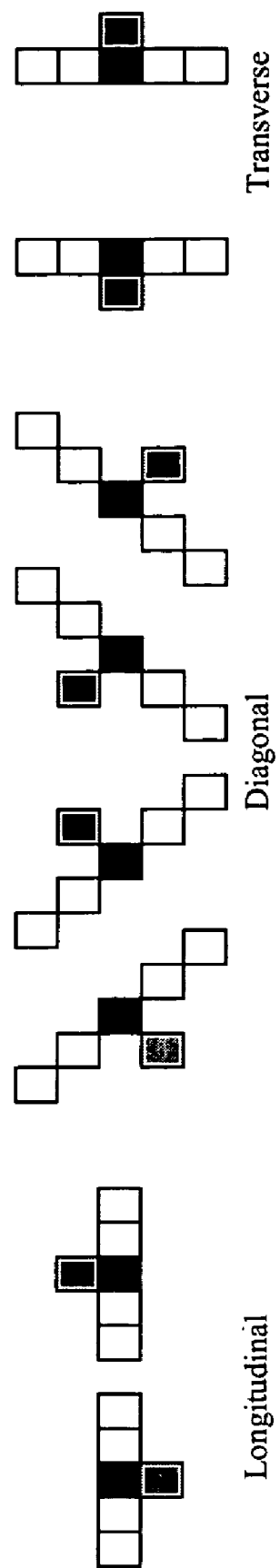
FIG. 8 illustrates templates used for the verification of crack seeds.

Crack Seed Verification. A crack is a fissure on a pavement surface with a high length to width ratio and a significant contrast to its neighboring area. Analyzing the contrast between a crack seed and its neighbor is the main cue for verifying if the crack seed is indeed a part of a crack. In addition, the crack seed must have at least one dark neighbor to be considered as a crack portion, not an isolated pixel. A set of templates is designed to calculate the contrast of a crack seed. Now referring to FIG. 8, which illustrates longitudinal, diagonal, and transverse templates used for the verification of crack seeds. Each template contains six pixels; however, it will be recognized that different numbers of pixels may be used depending on the application. The black pixel represents a crack seed to be evaluated; the gray pixel represents the direction in which the contrast is calculated, and the four white pixels are the neighbors of the seed. The contrast Cc of the seed is defined by as follows:

$$C_c = \frac{2 \times \overline{V} - V_b - V_g}{\overline{V}},$$

where $\overline{V}$ is the average value of all the six cells, and $V_b$ and $V_g$ are the values of the black and gray cells, respectively. If the contrast passes the threshold, the crack seed is validated. Otherwise, the computer continues to try with another template. If none of the six templates yields a satisfactory contrast, the seed will be discarded. If the $C_c$s from multiple templates exceed the threshold, the one that gives the maximum $C_c$ will be selected. From the template, a seed can be also determined as a longitudinal, transverse, or diagonal seed. This directional information is useful for avoiding false connections in the crack-tracing process. A longitudinal crack may consist of only longitudinal and diagonal seeds, while a transverse crack should have only transverse and diagonal seeds.

Grid Cell Analysis (GCA). Now with reference to FIGS. 9a to 9c, which illustrates cell characteristics in a pavement image. A primary clue for detecting cracks in a pavement image is that a crack is a thin strip of pixels whose intensities are appreciably darker than the surrounding background. In order to save the time in crack tracing and classification, the image is divided into grid cells of 8×8 pixels and to extract cracking information of small cells rather than the entire image. Although, one embodiment of the present invention uses a grid cell of 8×8 pixels, different applications may require grid cells of different sizes and shapes. The cracking information from each cell the length, width and contrast of a dark object in includes its mean brightness and minimum brightness and the presence of a dark strip within the cell. The cell is then categorized as either a non-crack cell or a crack seed by comparing its features to the preset thresholds. Only crack cells will be used as potential seed that may form cracks in the further processing. In some embodiments, the aforementioned algorithm may be in the form of a program embodied in a computer readable medium.

Figure 9:
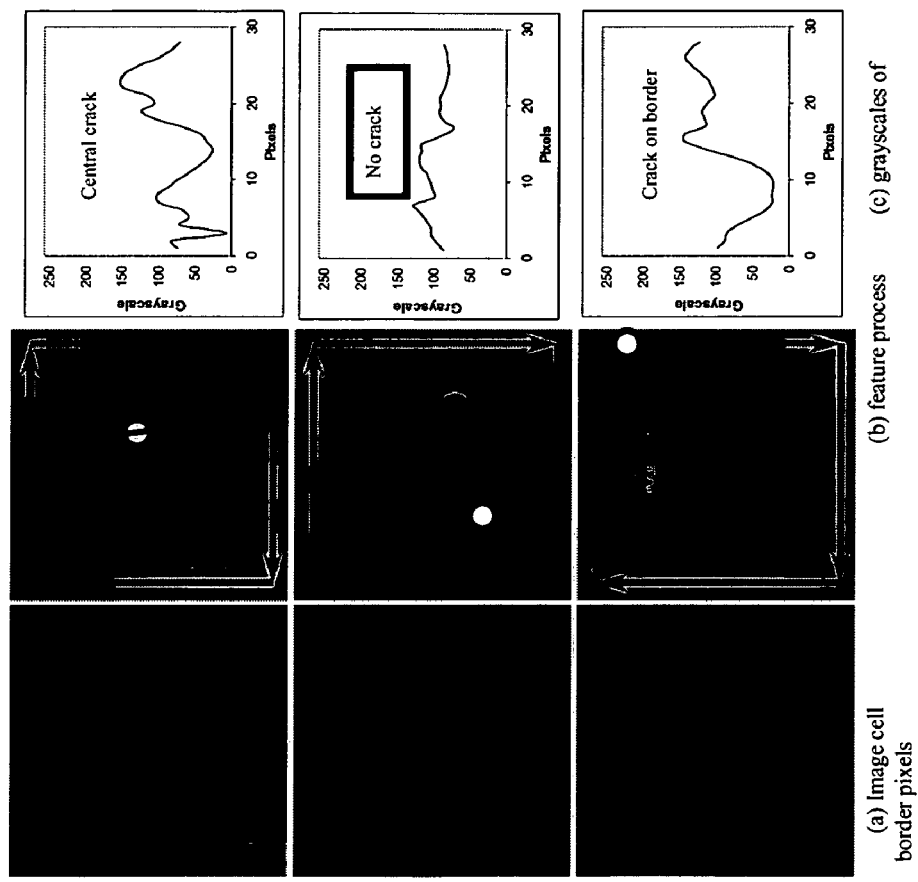
FIG. 9a-9c illustrates cell characteristics in a pavement image.

FIGS. 9a-9c show three different grid cells. The top one contains crack pixels (dark), the middle one does not have crack pixels and the bottom one has crack pixels on its border. The average grayscale of the border pixels, indicated by arrows in FIG. 9b, can be used as an overall brightness of the cell. FIG. 9c shows the brightness profiles of the border pixels of the three cells. In the top profile, the brightness shows two sharp valleys, indicating the crossing points of a crack on the border. The center of these two valley pixels can be selected as crack seed, and its grayscale can be replaced by one of its immediate neighbors that have the minimum grayscale value. This minimum grayscale and the coordinates of the center in the original image are recorded for the later crack verification. This information is useful for checking the orientation, length, width and contrast of the crack. When a cell does not contain a crack, its border profile (middle) shows no apparent valley. This cell will be marked with a non-crack flag at the pixel that has the minimum grayscale in the cell. If the border grayscale profile shows only one significant valley (bottom), the cell may have an edge crack. The darkest pixel on the border is selected as a crack seed. Whether this cell is part of a crack depends on the characteristics of its neighbor cells.

FIG. 10a illustrates an image of the pavement and FIG. 10b is a map of the cell. The cell map of a pavement image can be created by setting the grayscales of the 8×8 pixels of each grid cell to the selected minimum value. Furthermore, each cell can be reduced to one pixel to form a scaled down image in which potential crack seeds are marked. The scaled down image of crack seeds is the one to be used for further verifications of cracks.

Crack Cluster Connection. Now referring to FIGS. 11a-11c which illustrates tracing cracks from the seeds, verified seeds FIG. 11a, FIG. 11b illustrates seed clusters and FIG. 11c illustrates traced cracks. The white dots in FIG. 11a present all verified seeds of the image in FIG. 11a. Compared to the original image, the volume of data has been dramatically reduced. The next step is to connect individual seeds into seed clusters. Starting from one seed, a crack cluster grows by accepting adjacent seeds one at a time until no close seed can be taken. The size of crack clusters varies in the image. The information, such as the weight or the number of seeds in the cluster, the GCA parameters of each seed, the direction and the starting and ending seeds, should be stored for each cluster. FIG. 11b shows the crack clusters of FIG. 11a.

A crack cluster can be used to draw a path in the corresponding pavement image. A valid crack cluster must have a clear, dark, and narrow strip along the path. To verify whether a crack cluster corresponds to a real crack, three features of the crack path in the original image are examined. First, the contrast of the pixels on the path to the neighbor pixels on both sides should not exceed a threshold to avoid light marks of skid or paint. Second, the width and the width variation of the strip should not go beyond the given limits to omit shadows, pavement joints, and other non-crack objects. Finally, the path must have a certain length to be separated from short segments that may be simply caused by pavement noise or unwanted features. After crack clusters are verified and short clusters are deleted, the clusters that are in the vicinity and have similar orientations can be traced to become a long crack (FIG. 11c). The direction of a traced crack is calculated based on its starting and ending coordinates, and therefore the crack can be classified as longitudinal or transverse.

Figure 12:
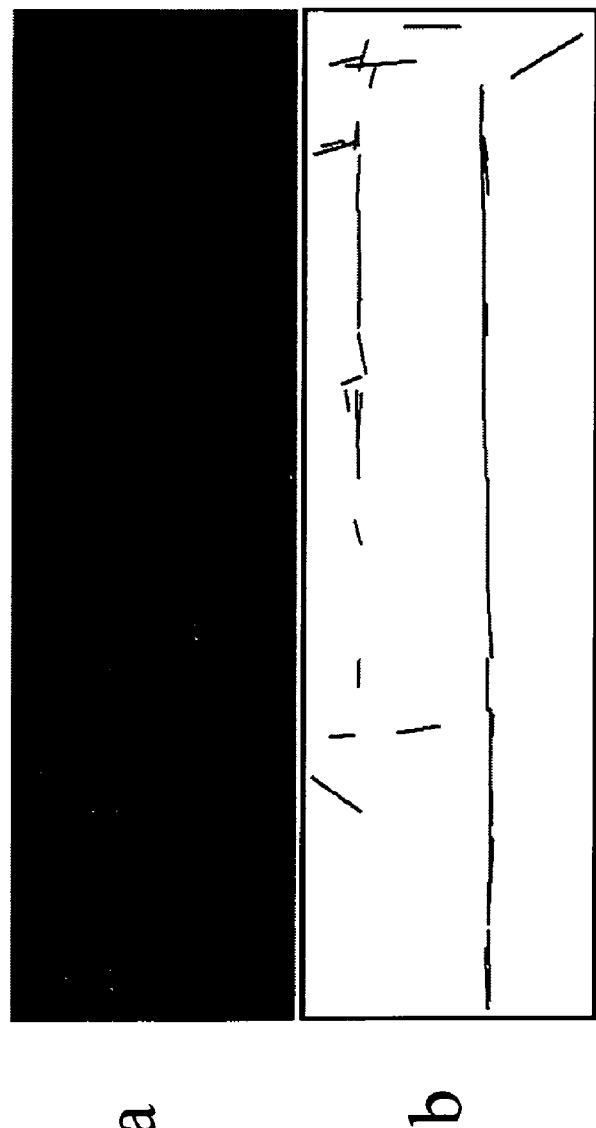
FIG. 12a is an image of a 10-meter section of pavement and 12b is a crack map of the section of pavement.
Figure 13:
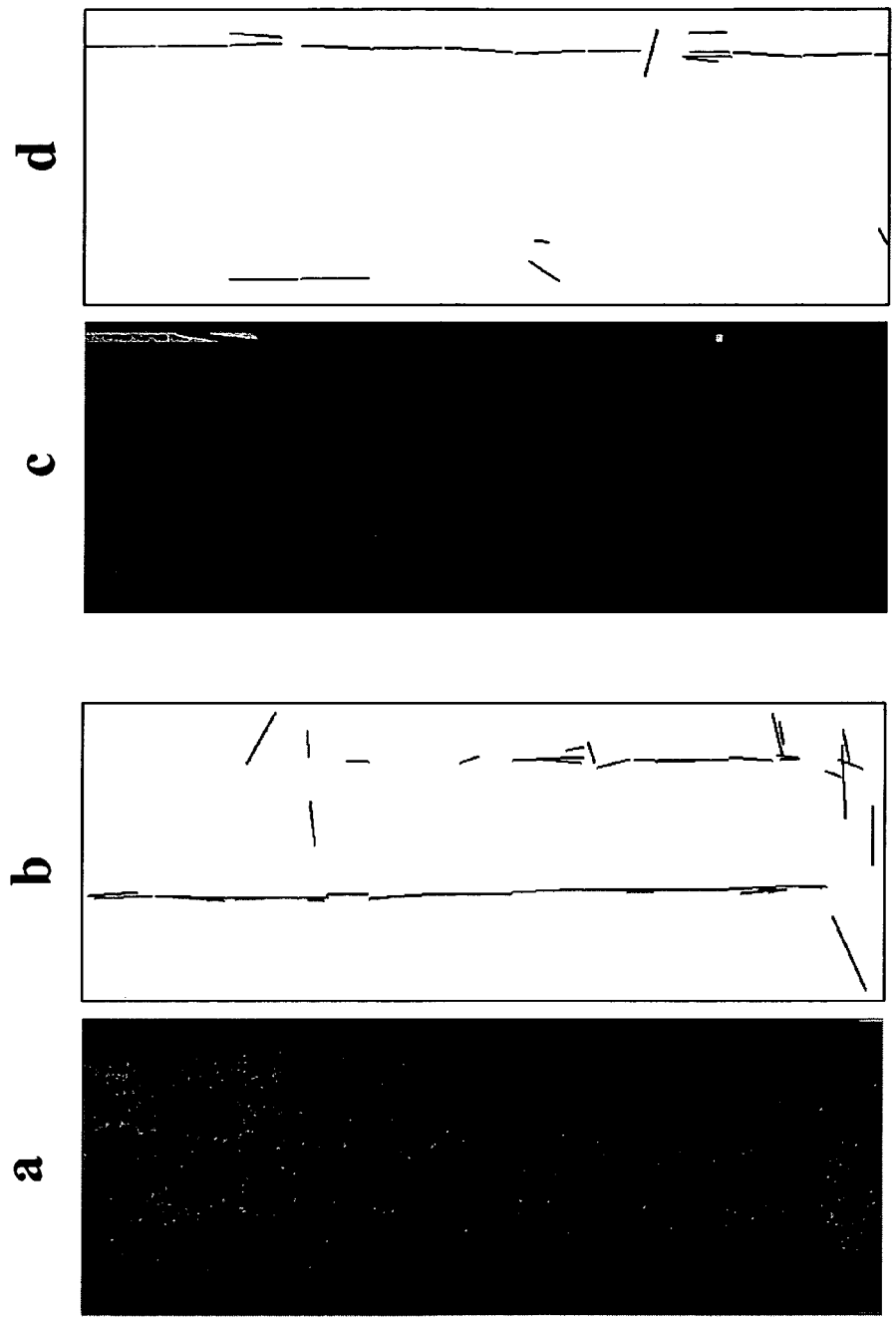
FIG. 13a is an image of an unsealed section of pavement, 13b is a crack map of the section of unsealed pavement and 13c is an image of a sealed section of pavement and 13d is a crack map of the section of sealed pavement.

To facilitate the validation tests, the present invention also provides the functions for capturing and saving pavement images over a long distance and the functions for visual feedback (e.g., crack maps) of the detection results. It continuously records the full size images of 1 km (0.62 mile) pavement or the compressed images of 16 km (10 miles) pavement. The measurements are compared with those obtained from the on-screen visual examinations of the same images. FIG. 12 depicts a 10-meter pavement section with its corresponding crack map output. FIGS. 13a-13d illustrate a 10-meter pavement section with its crack map output having an unsealed crack and a sealed crack. FIG. 13a represents the image of the unsealed pavement section, whereas FIG. 13c represents the image of the sealed pavement section. FIG. 13b represents the crack map output of the unsealed pavement section, whereas FIG. 13d represents the crack map output of the sealed pavement section. The cracks in the crack maps are the simplified drawings of verified crack clusters, which do not intend to reflect the fine details of cracks rather than their locations and orientations. Continuous crack maps are stored along with interval crack, providing both summary data and distributed data for scanned pavements.

Figure 14:
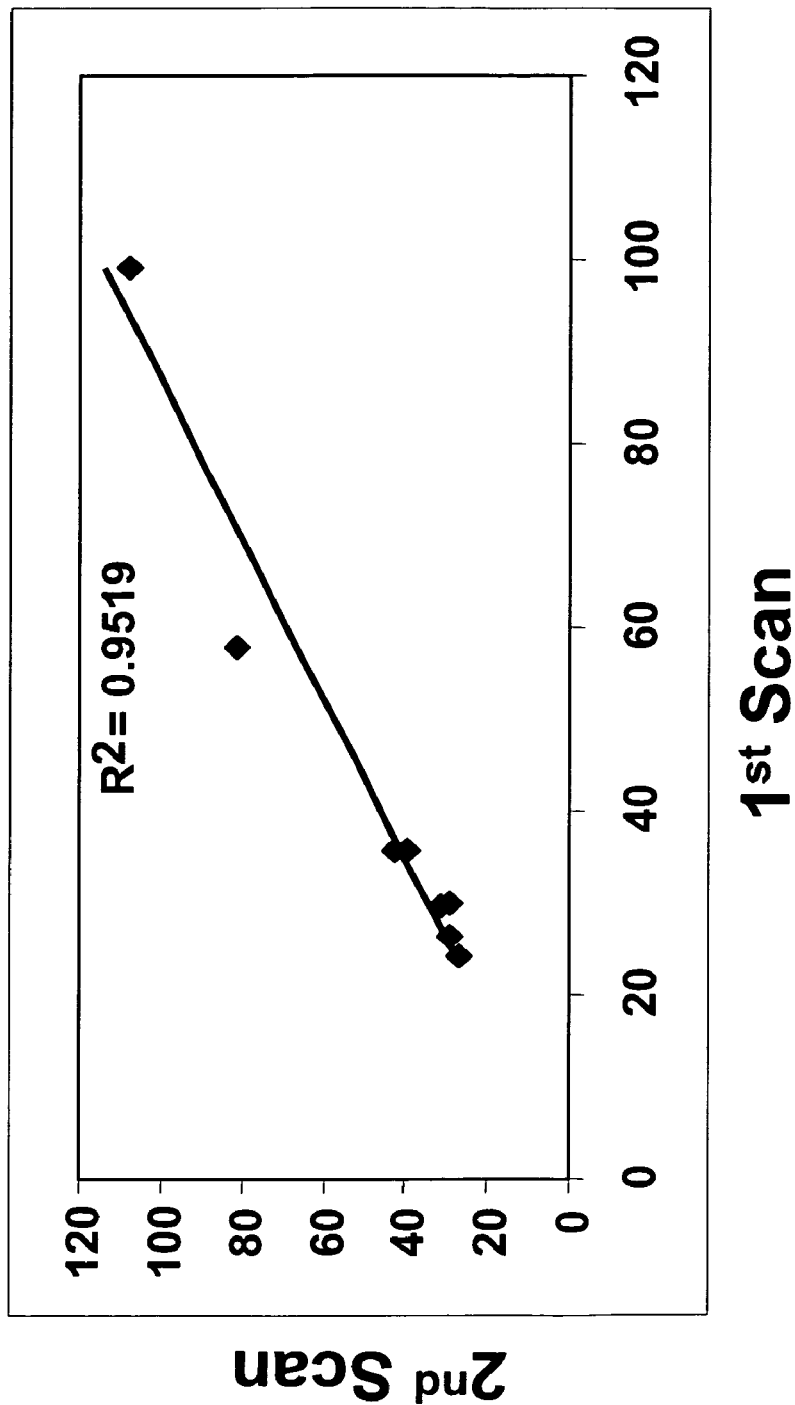
FIG. 14 is a graph of the correlation between the first and second scans.

In one example, the accuracy of the results produced using the present invention was evaluated by comparing the results of the on-screen visual assessment of the 100 pavement images chosen from pavement sections representing various cracking situations. FIG. 14 represents a graph of the correlation of multiple scans. The correlations ($R^2$) between the two evaluation methods are 0.91 for longitudinal cracking and 0.96 for transverse cracking. The repeatability of the results produced using the present invention was evaluated by scanning the same pavement (asphalt) section multiple times. The survey data were recorded at an interval of 30.5 m (100 ft). The correlations of the cracking data of any two scans were used to examine the consistency or repeatability of multiple tests.

Figure 15:
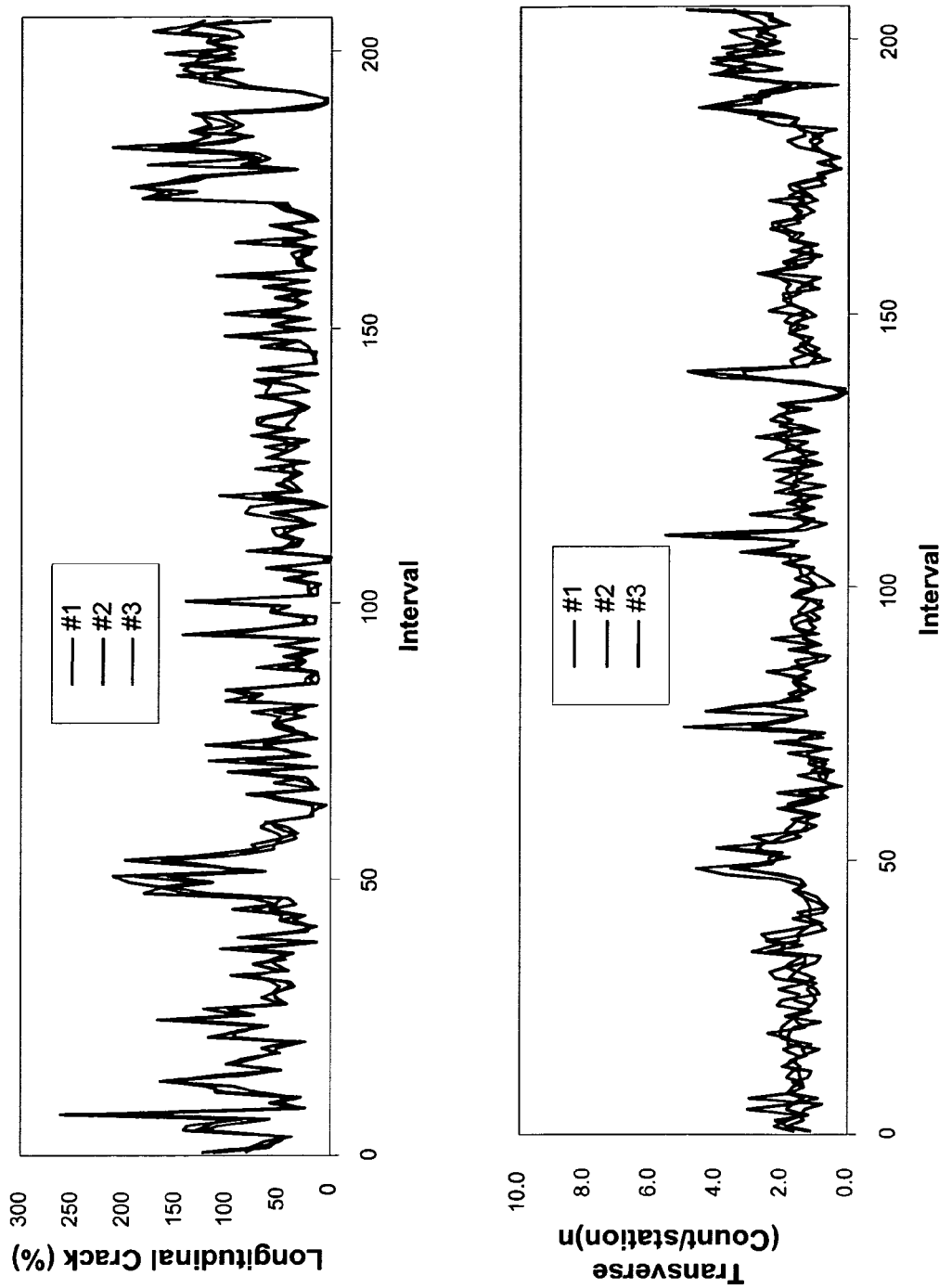
FIG. 15 is a graph of the repeatability of the results with multiple scans where 15a is longitudinal cracks and 15b is transverse cracks.

With respect to FIG. 15, a plot of the cracking data of the three scans (#1, #2, and #3) on a 3.2 km (2 miles) pavement at a constant speed of 88 km/h (55 mph). The correlations of both longitudinal and transverse cracking data between two scans are all above 0.9. Similar results were achieved on many other pavement sections. Since it is difficult to maintain the driving path of the vehicle to be the same in different runs, it is logical to see the difference in the outputs as shown in FIG. 16. Other factors that may contribute to the variations of multiple scans are the difference in the lighting condition and the vehicle speed.

FIG. 16 a plot of the cracking data of the three scans (e.g., #1 heavily cloudy, #2 sunny, and #3 cloudy) under different environmental conditions. The weather condition can affect the image quality and hence the output data since the present invention uses the natural lighting for image capturing at the reporting time. Other embodiments of the present invention may use external lighting. The FIG. 16 shows the longitudinal cracking of an asphalt pavement measured in three days, which had different weather conditions (sunny, cloudy and heavily cloudy). The correlation analysis of these scans suggested that the present invention can provide fairly consistent measurements under different lighting conditions, but the consistency drops significantly. The cloudy day had sufficient natural lighting for image capturing, but did not cause any shadow in the images. Therefore, it provided an ideal lighting condition for the present invention. In the heavily cloudy day, the image became dark and the contrast was low. Detecting shallow cracks became more problematical. In the sunny day, the sunlight might be partially obstructed by the vehicle, causing errors for the cracks under the shadow. It is asserted that a device that is able to provide a constant lighting condition is essential for an automated pavement cracking inspection system to ensure the reliable and consistent performance. A linear lighting device is being developed for the present system. Besides the lighting variations in those days, the difference in driving path and speed may be another main factor contributing to the lower correlations.

Figure 18:
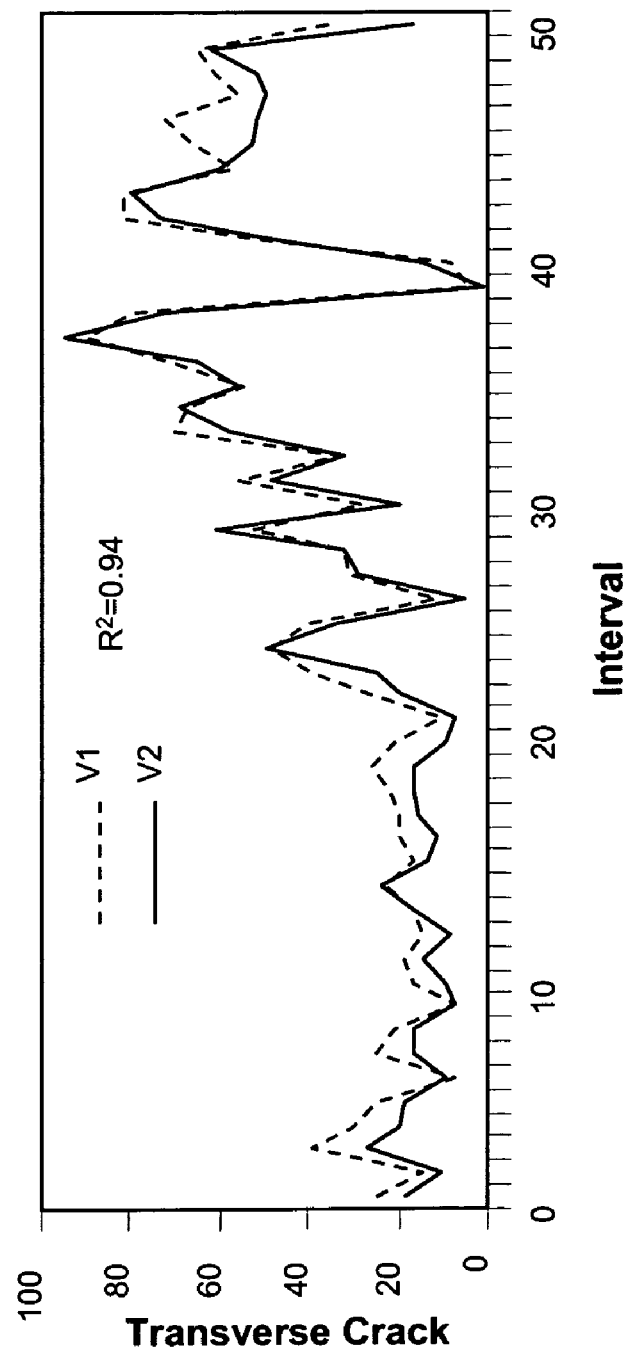
FIG. 18 is a graph of the percent transverse cracks verses distance showing the repeatability of the results with multiple scans.

FIG. 17 demonstrates the repeatability of the data from the present invention with variations in vehicle speeds. The scanning rate of the camera varies with the speed of the vehicle to keep the image resolution in the longitudinal direction constant. The vehicle may generate different levels of vibrations when it travels at different speed. Hence, the vehicle speed may affect output results. FIG. 18 displays the longitudinal cracking data collected at three different speeds on a shorter distance pavement (asphalt) where public traffic was limited. The data show that the present invention can provide consistent results when the vehicle travels at a speed varying from 56 to 88 km/h. However, it is observed that at 88 km/h the system seemed less sensitive to small cracks and other speeds may be used depending on the application.

Figure 19:
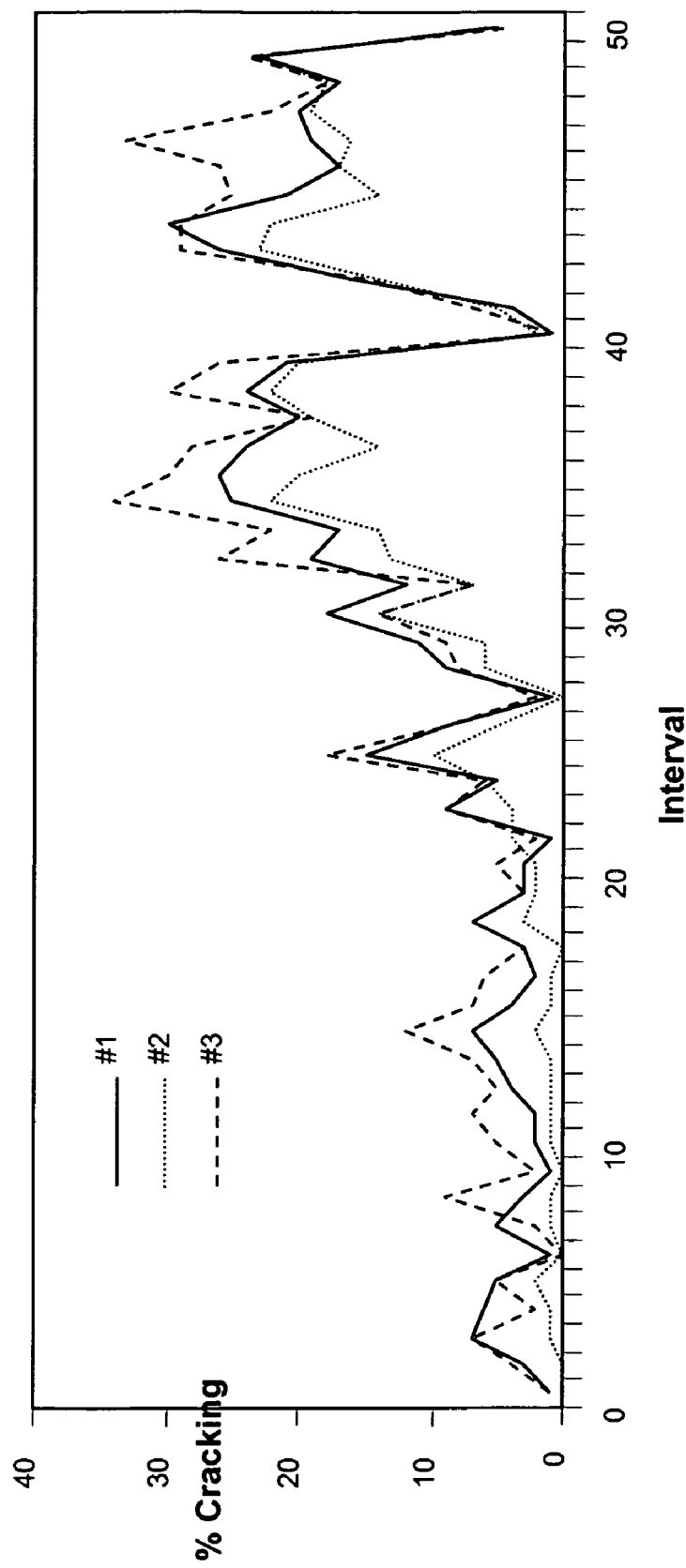
FIG. 19 is a graph of the percent longitudinal cracks verses distance showing the repeatability of the results with multiple scans.

To determine the reproducibility of the present invention results from multiple units installed on different vehicles (V1 and V2). The area evaluated was a concrete pavement, and the two vehicles output highly consistent counts for transverse cracks as seen in the graph of FIG. 19. Table I displays the correlation between the results of multiple scans of transverse cracks. Table I provides further information about the correlations of the multiple scans (#1, #2, and #3) of the two vehicles on the same pavement. Both vehicles have a similar level of correlations for their multiple scans. Table I displays the repeatability of results of multiple scans of transverse cracks;

| | VEHICLE | |
|---|---|---|
| SCAN | V1 | V2 |
| #1-#2 | 0.88 | 0.96 |
| #1-#3 | 0.96 | 0.96 |
| #2-#3 | 0.91 | 0.97 |

The same concrete pavement was tested in the AASHTO protocol in which a pavement is longitudinally divided into four paths, left wheel path (LWP), right wheel path (RWP), between wheel path (BWP) and outside wheel path (OWP), and the linear density of cracks in each path is calculated. The high repeatability of results using the present invention is also evidenced by the AASHTO data presented in FIG. 19 and Table II. The cracking data in FIG. 19 are the percentiles of the cracks in each interval within the left wheel path. Three different scans on LWP show the consistent trend of cracking. The correlations of the AASHTO data in all the paths are presented in Table II. Table II lists correlations ($R^2$) of multiple scans in AASHTO Data.

| | POSITION | | | |
|---|---|---|---|---|
| SCAN | LWP | RWP | BWP | OWP |
| #1-#2 | 0.96 | 0.91 | 0.93 | 0.97 |
| #1-#3 | 0.95 | 0.83 | 0.92 | 0.94 |
| #2-#3 | 0.92 | 0.82 | 0.92 | 0.93 |

Figure 20:
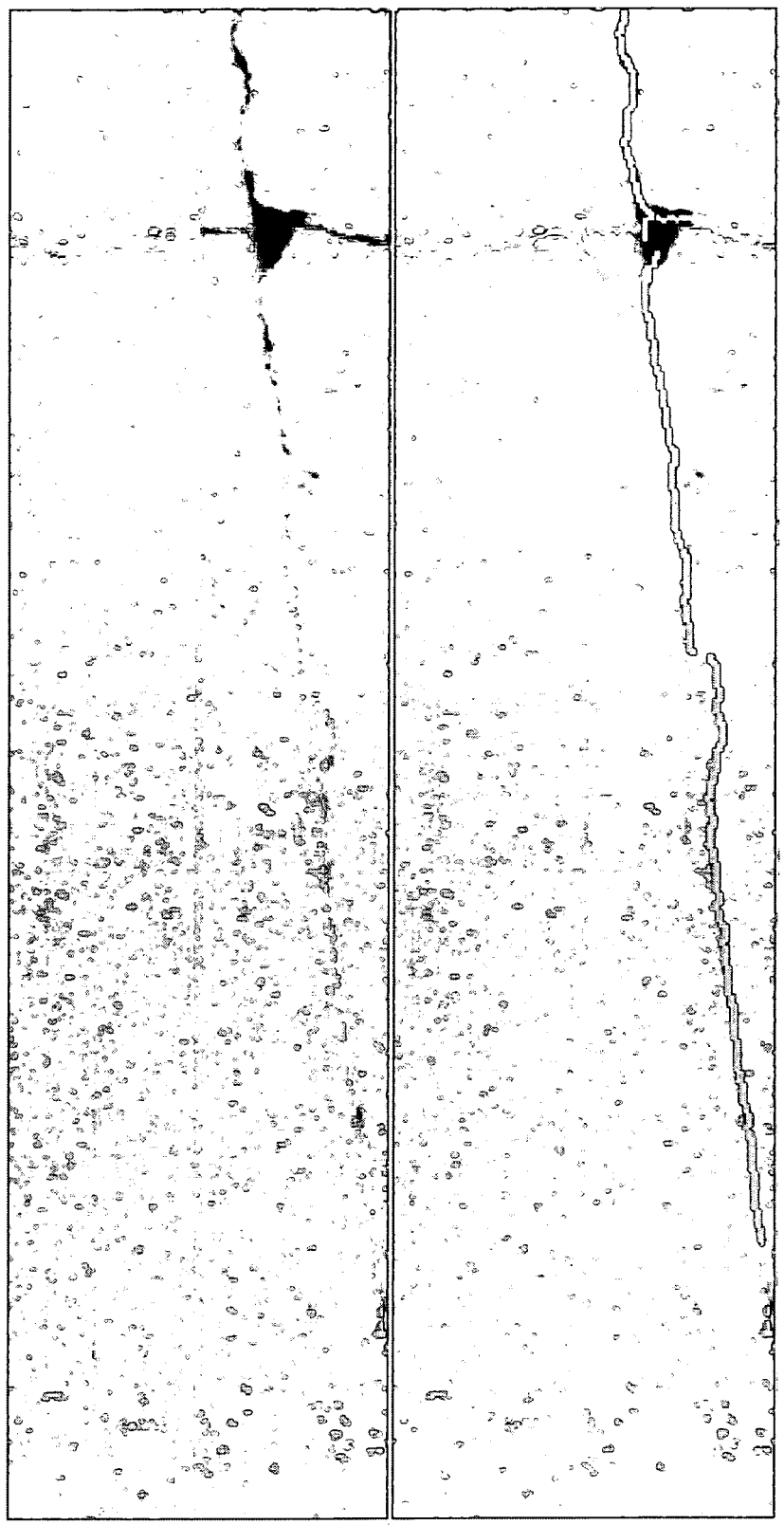
FIGS. 20-22 are images a crack map of the section of pavement.
Figure 21:
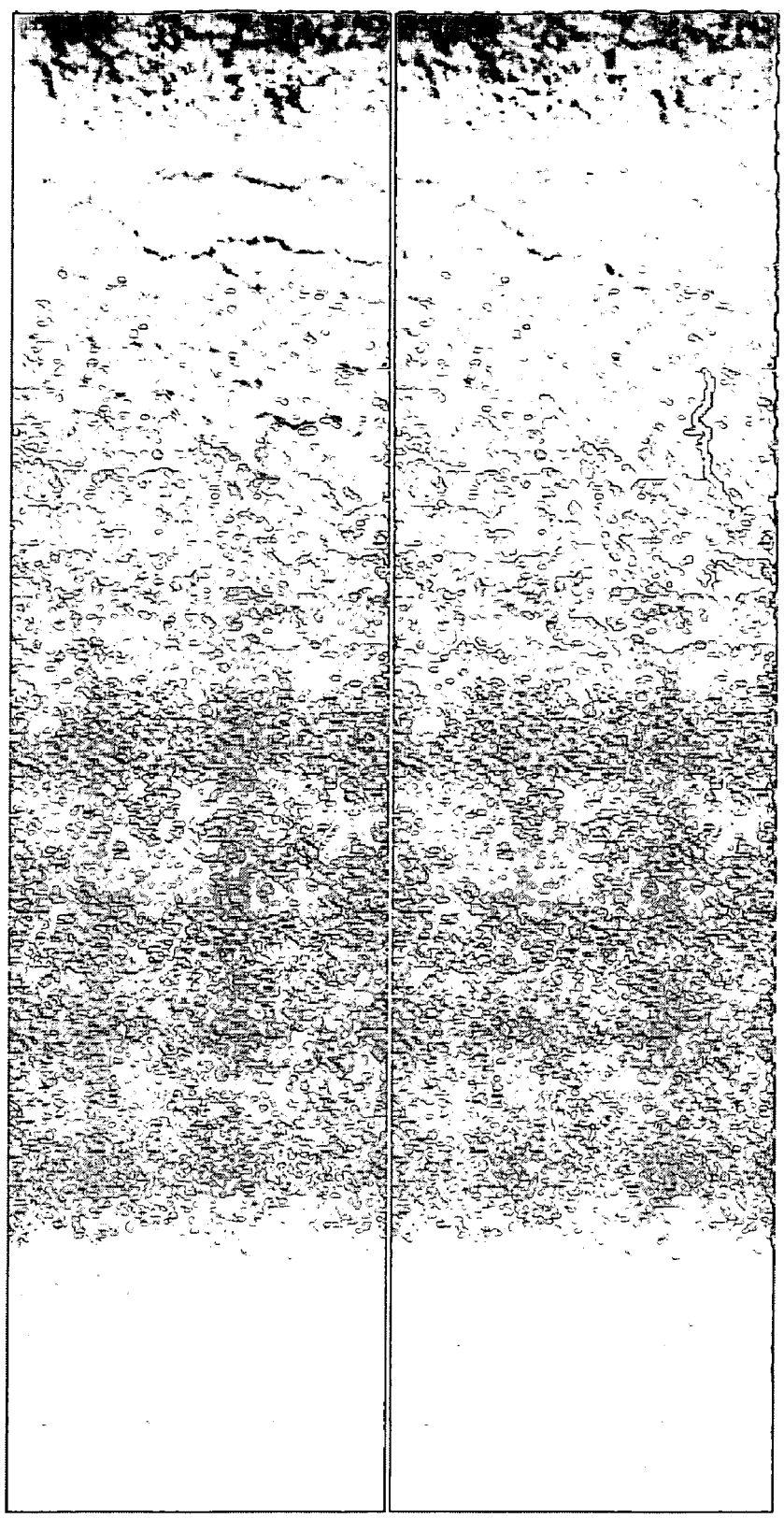
Figure 22:
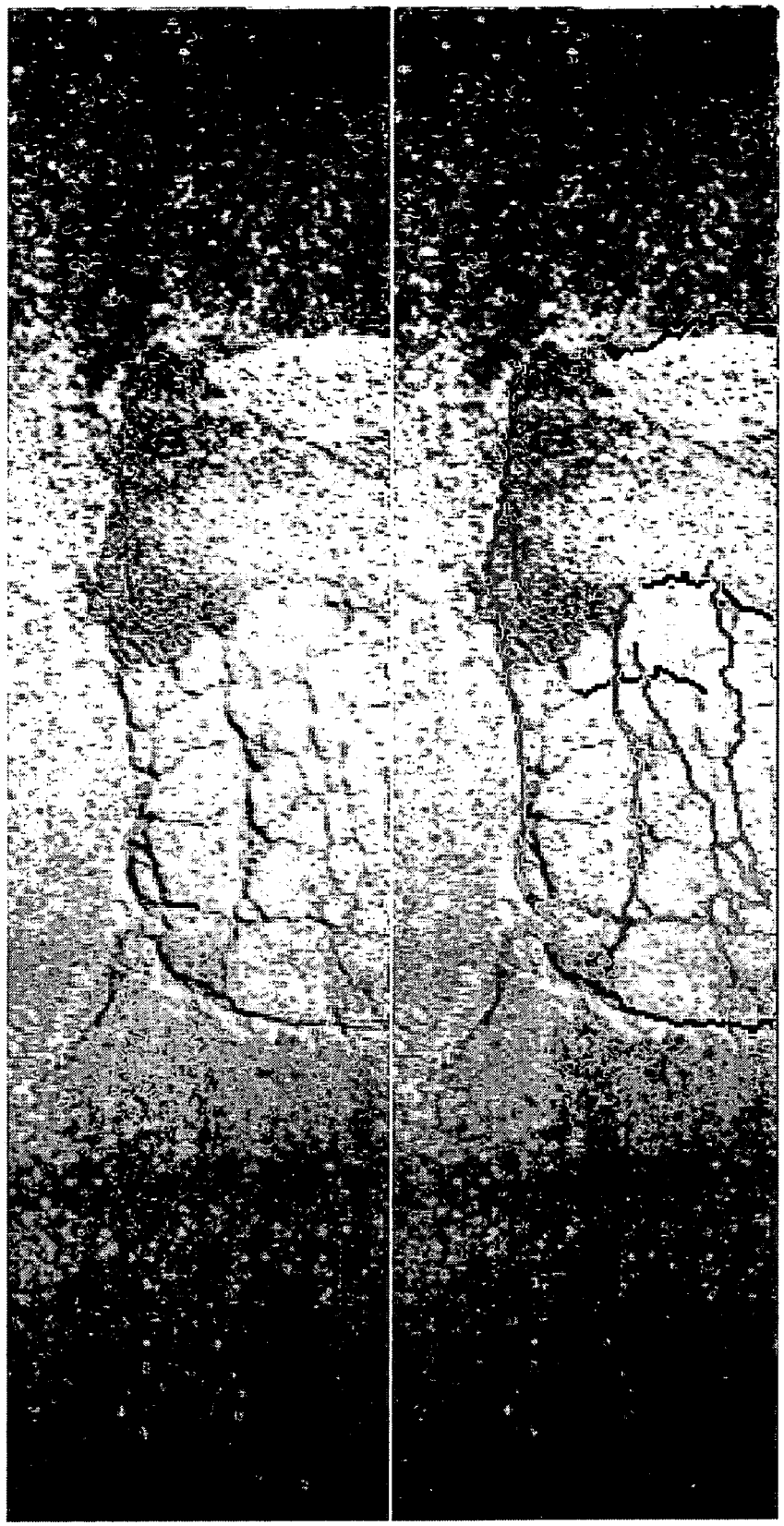

FIGS. 20-22 are images of the pavement and the corresponding map of the cracks for the cells.

The present invention also provides an image-processing algorithm for high-speed, real-time inspection of pavement cracking. The algorithm includes three or more steps. The first step is called the "grid cell" analysis (GCA). The GCA method divides a pavement image into grid cells of 8×8 pixels and classifies each cell into a non-crack or crack cell by using the grayscale information of the border pixels. A scaled down image, whose size is only 1/64 of the original image, is formed using a pixel selected from each cell to represent the cell. In the scaled down image, the pixels that are chosen crack cells are regarded as crack seeds. The second step is to verify the crack seeds by using the contrast of a crack seed to its neighbors. This step can remove many seeds that result from pavement noise. The verified crack seeds may form a crack cluster if they fall on a linear string. The third step is to verify and connect crack clusters to form cracks for final measurements including crack count, lengths, and orientations. A crack cluster corresponds to a dark strip in the original pavement image that may or may not be a section of a real crack. Additional conditions to verify a crack cluster include the requirements in the contrast, width and length of the strip. If verified crack clusters are oriented in similar directions, they can be joined to become one crack. This example is for illustrative purposes and the skilled artisan will know that the steps may be combined, separated and/or different steps and protocols may be added.

The present invention also includes an algorithm that permits the detection of cracks in one image to be done in less than 25 ms, which is the maximum the time needed for the frame grabber to accumulate line images from the camera to form a new frame image. Therefore, the system of the present invention is able to perform real-time, highway speed and 100% coverage inspections on pavement cracking distress. The repeatability tests also show that the present invention provides consistent results in repeated runs and at different driving conditions.

Figure 23:
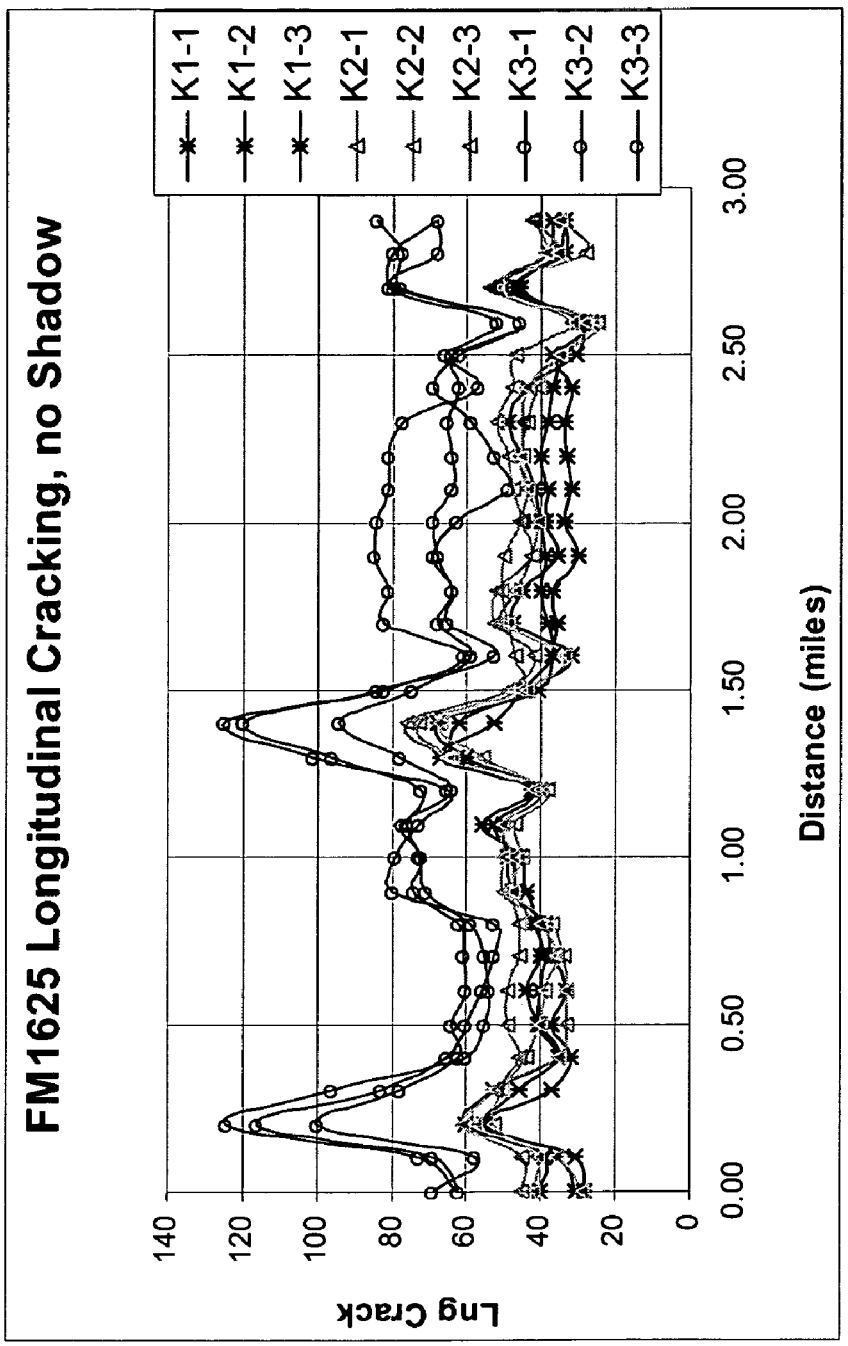
FIG. 23 is a graph of the cracking verses distance under non-shadow conditions.
Figure 24:
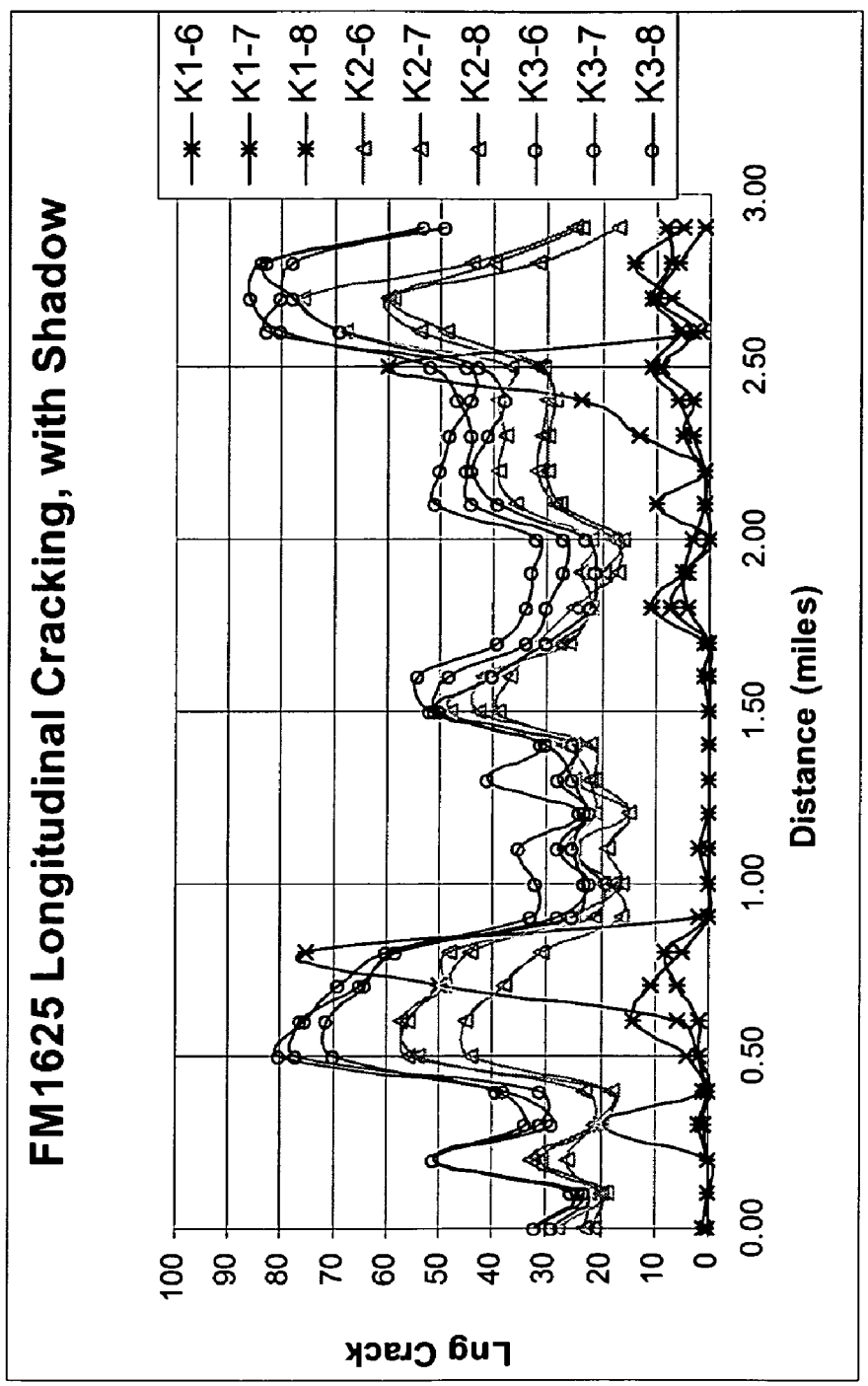
FIG. 24 is a graph of the cracking verses distance under shadow conditions.

The present invention also includes an artificial light source for illuminating the surface. The light source includes one or more arrays of LEDs arranged to form an array that will illuminate the surface. The detection device may be filtered to remove the effect of sunlight and to compensate for shadows. In some instances one or more of the LEDs emit at about 610 nm; however other sources include LEDs that emit at between about 400-450 nm, 450-500 nm, 500-570 nm, 570-590 nm, 590-610 nm, 610-780 nm and combinations and mixtures thereof. In some instances, the light spectrum matches the camera to enhance the quality of the illumination. FIGS. 23 and 24 are graphs of the cracking verses distance under different conditions. FIG. 23 displays cracking images in the absence of shadows, while FIG. 24 show cracking with shadows present. The conditions include the lighting, e.g., K1: no light; K2: light-on in afternoon; K3: light-on at night and Run: 1, 2, 3: no shadow and 6, 7, 8: shadow. The speed for the experiments was 30-35 mph except two night runs K3-3 and K3-8.

Figure 27:
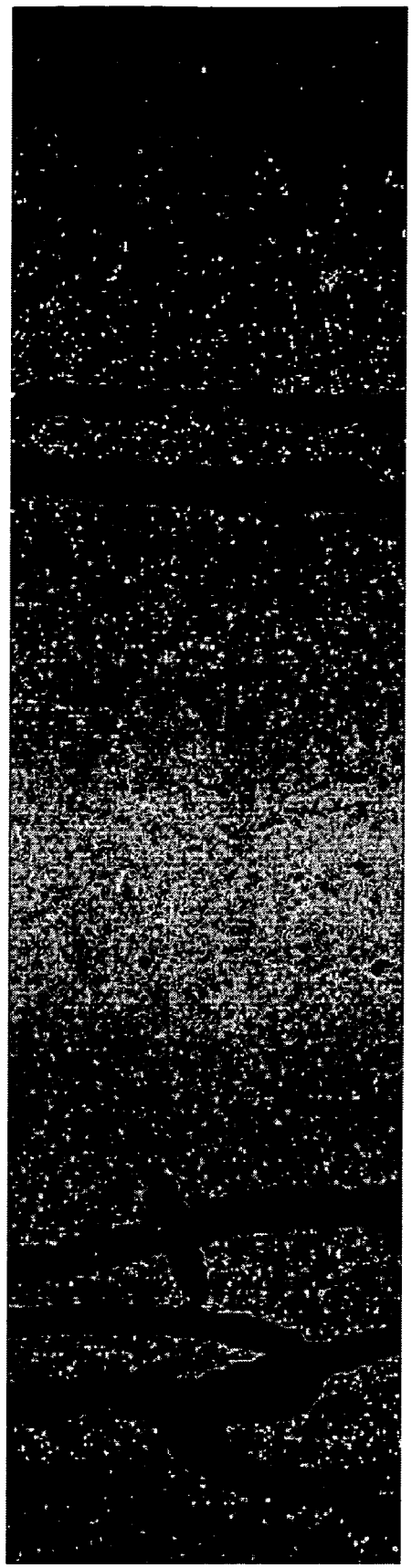
FIG. 27 is an image of the pavement at night using LED illumination.

The accuracy of the results produced using the present invention was evaluated. FIGS. 25 and 26 are correlation coefficients of the displays cracking images in the absence of shadows and in the absence of shadows corresponding respectively. The conditions include the lighting, e.g., K1: no light; K2: light-on in afternoon; K3: light-on at night and Run: 1, 2, 3: no shadow and 6, 7, 8: shadow. The speed for the experiments was 30-35 mph except two night runs K3-3 and K3-8; and With reference to FIG. 27 a night time image of the pavement and a map of the corresponding cell. It is clear to see that the LED illumination device allows the surface to be illuminated to an extent that the surface can be recorded.

One embodiment of the present invention includes an automated pavement rating system having a digital line scan camera, laser-line illuminator, and proprietary crack detection and classification software and is able to perform real-time pavement inspection with 100% distance coverage at travel velocities from 3 to 70 mph. It covers 10 to 12-foot wide lane with a resolution of 1.5 mm to 1.75 mm/pixel. The system consumes approximately 150 w electrical power, and can perform both daytime and nighttime survey.

One embodiment of the present invention includes a custom design enclosure that uses a StockerYale Magnum II line projector (referred to as Laser) that has an 810 nm 4 w laser diode to illuminate the pavement for image acquisition and the fan angle of the projector is nearly 80°. It is mounted side by side with a linescan camera in a custom design enclosure. The front plate of the enclosure has an 8" long and 0.5" wide open slot aligned with the central line of the optics of the Laser and the camera. The enclosure is installed vertically downward at height of 7 feet above the ground, and the laser line approximately covers 12 ft wide pavement surfaces.

One embodiment of the present invention includes a controller or control box placed near the operator to control the power supply and the interlock switch of the unit to turn on/off the 12 VDC to the unit. For example, when it is at the OFF position, the entire unit is powered off. The switch may also be included for manual turning on/off the interlock switch of the Laser so that in the OFF position, no laser beam will be emitted from the unit, but the circuit is still powered on to maintain a constant diode temperature. When the vehicle stops, the operator may switch of the rocker switch to shut off the laser beam, regardless of the protective actions induced from the proximity sensor or from the vehicle speed signal.

One embodiment of the present invention includes a GPS/DMI unit to send the actual speed of the vehicle to the computer at a rate of at least three times per second. Whenever the speed is below about 5 mph, the computer sends a signal to the digital I/O unit, which is housed in the controller. The I/O unit in turn outputs +5V volt (e.g., 1-12V) to the modulation control of the Laser, and the laser beam is shut off instantaneously. When the system is in maintenance or service, a pseudo speed can be set through the software to disable the digital I/O unit so that the beam can maintained. The controller, may include numerous switches, e.g., the switch may be for a key lock switch to turn on/off the power; the switch may be in series connected to the interlock switch of the Laser; the switch may be for a rocker switch on the front panel of the controller; the switch may be for a relay controlled by the proximity sensor; the switch may be for another relay controlled by the proximity sensor on the rear bumper; the switch may be for a remote interlock switch; or other switch or relay known to the skilled artisan.

One embodiment of the present invention includes one or more proximity sensor on the enclosure or on the vehicle (for example, the AUDIOVOX® vehicle reverse sensing systems that provide highly sophisticated, ultrasonic obstacle detection). The proximity sensor detects in three distinct zones, which correspond with the distance from the enclosure to an approaching subject. Zone 1 provides detection in the range of about 4-6 feet, the sensor sends signals to the speaker to alert the subject with slow beeps. Zone 2 provides detection in the range of 2-4 feet with rapid beeps, and Zone 3 provides detection in the range of 0-2 feet with solid tones and also turns off the interlock switch of the Laser. The skilled artisan knows that other tones and types of alerts may be used to identify the position relative to the vehicle.

Figure 28:
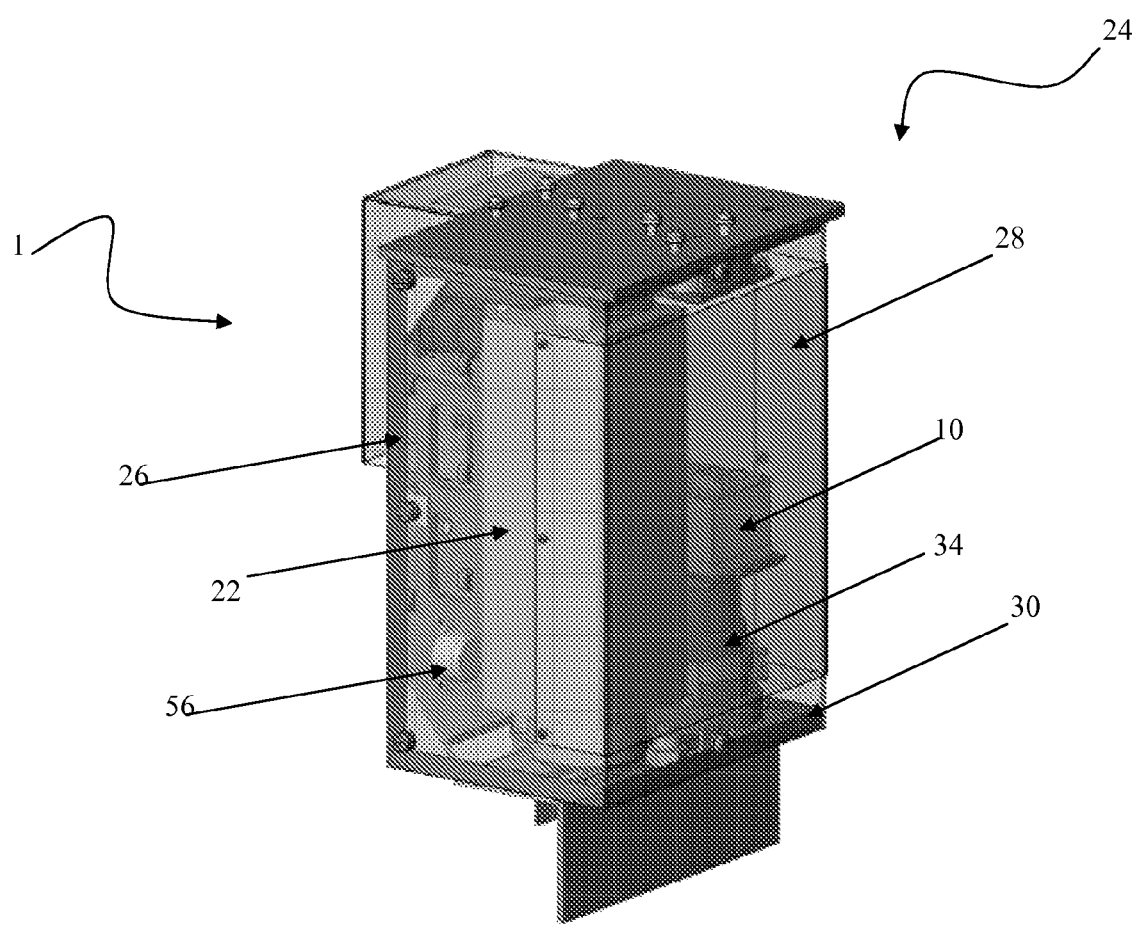
FIG. 28 is an image of another embodiment of the camera setup of the present invention.

With reference to FIG. 28 is another embodiment of the camera setup of the present invention. The surface distress measurement system 1 is attached to a vehicle (not shown) so that the first camera unit 10 is housed in a mounting assembly 24 that is attached to a vehicle (not shown). The mounting assembly 24 includes back plate 26, front cover 28 and base 30 to protect the internal components from the external environment. A camera unit 10 (e.g., line scan camera) is mounted to a tilting mount (not shown) that accommodates the movement of the camera 10. The camera unit 10 may include a lens 34 that may be interchanged depending on the particular specification necessary. A laser or laser pointer (not shown) may also be attached to the mounting assembly 24. The laser pointer (not shown) may be useful to determine coverage and focus when an IR laser is used. In addition, a filter (not shown) may be adapted to reduce interference. A laser line projector 22 may be positioned about the mounting assembly 24 (e.g., within or adjacent to the mounting assembly 24). The laser line projector 22 may be an IR laser line projector (e.g., StokerYale Magnum II laser projector), although the skilled artisan will recognize that the type and specifications of the camera may vary and the camera unit 10 may be fitted with a variety of different lenses and filters, e.g., a 20 mm F-mount lens and an IR band-pass filter, e.g., 82 mm IR87. In addition the present invention may include a speaker 56 to provide an audible warning.

Figure 29:
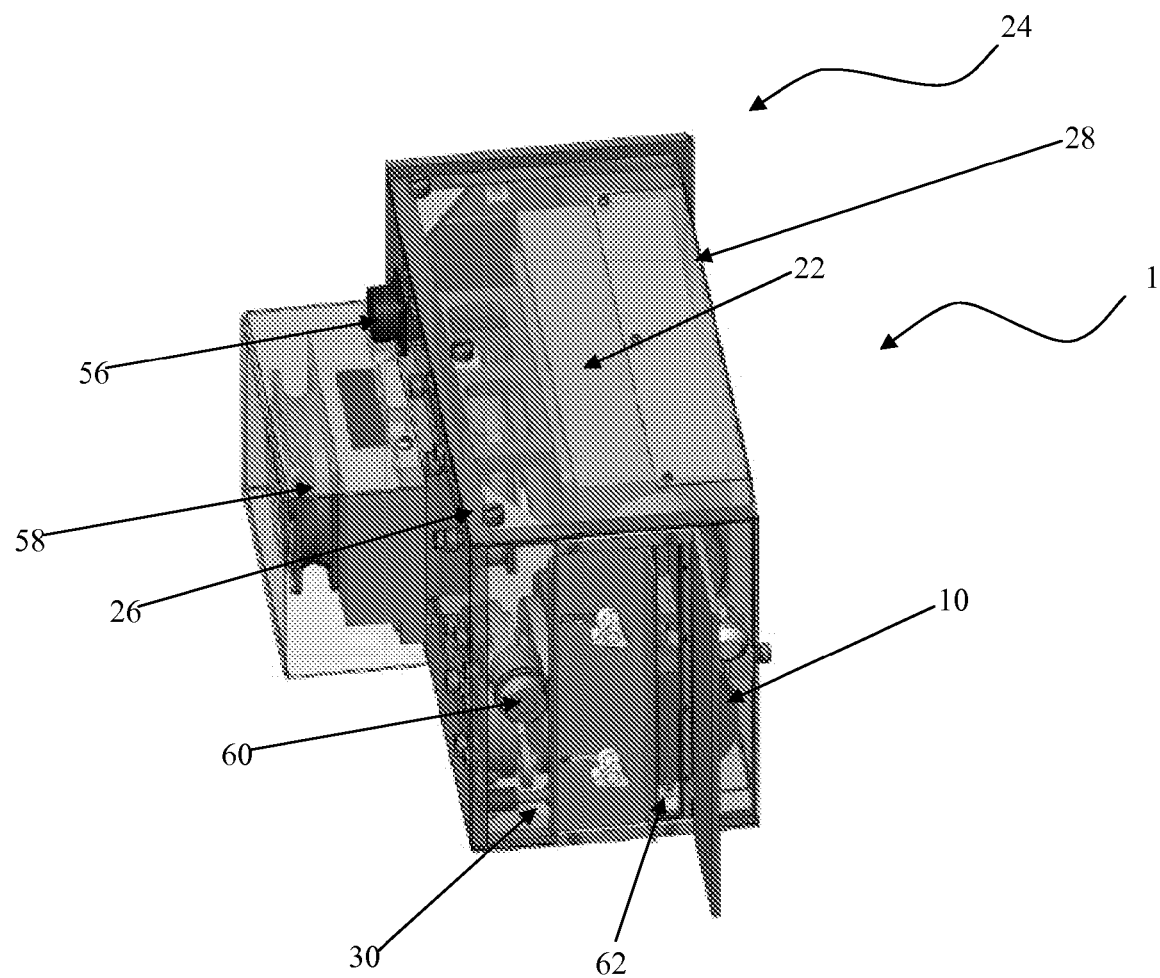
FIG. 29 is bottom view of the embodiment of the camera setup of the present invention shown in FIG. 28.

With reference to FIG. 29 is bottom view of the another embodiment of the camera setup of the present invention. The surface distress measurement system 1 is attached to a vehicle (not shown) so that the first camera unit 10 is housed in a mounting assembly 24 that is attached to a vehicle (not shown). The mounting assembly 24 includes back plate 26, front cover 28 and base 30 to protect the internal components from the external environment. A camera unit 10 (e.g., line scan camera) is mounted to a tilting mount (not shown) that accommodates the movement of the camera 10. The camera unit 10 may include a lens (not shown) that may be interchanged depending on the particular specification necessary. A laser or laser pointer (not shown) may also be attached to the mounting assembly 24. The laser pointer (not shown) may be useful to determine coverage and focus when an IR laser is used. In addition, a filter (not shown) may be adapted to reduce interference. A laser line projector 22 may be positioned about the mounting assembly 24 (e.g., within or adjacent to the mounting assembly 24). The laser line projector 22 may be an IR laser line projector (e.g., StokerYale Magnum II laser projector), although the skilled artisan will recognize that the type and specifications of the camera 10 may vary. In addition the present invention may include a speaker 56 to provide an audible warning that may or may not be in electrical communication with a proximity sensor 60. A thermoelectric cooling assembly 58 is positioned about the mounting assembly 24 to provide cooling for the components during use. Opening 62 is positioned on the bottom 30 to allow transmission to the surface (not shown).

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. T. Fukuhara, K. Terada, M. Nagao, A. Kasahara, S. Ichihashi, Automatic Pavement-Distress-Survey System, J. Transportation Engineering, ASCE 116 (3), 280-286, 1990.
2. S. McNeil and F. Humplick, Evaluation of Errors in Automated-Distress Data Acquisition, J. Transportation Engineering, ASCE, 117 (2), 224-241, 1991.
3. K. Wang, Design and Implementation of Automated System for Pavement Surface Distress Survey, Journal of Infrastructure System, 6 (1), 24-32, 2000.
4. L. Sjogren, State of the art: Automated Crack Measurement of Road Surface, research project report, Swedish National Road and Transportation Research Institute (VTI), 2002.

5. Gregory D. Cline, Mohamed Y. Shahin, and Jeffrey A. Burkhalter, Automated Data Collection for Pavement Condition Index Survey, annual meeting of Transportation Research Board, 2003.
6. J. Pynn, A. Wright, and R. Lodge, Automated Identification of Crack in Road Surface, Image Processing and its Application, Conference Publication No. 465, 671-675, IEEE, 1999.
7. H. Fukui, J. Takagi, Y. Murata, and M. Takeuchi, An Image Processing Method to Detect Road Surface Condition Using Optical Spatial Frequency, Intelligent Transportation System, Conference Publication, 1005-1009, IEEE, 1997.
8. K. David and S. Frances, Automatic Road-Distress Classification and Identification Using a Combination of Hierarchical Classifications and Expert System-Subimage & Object Processing, Image Processing, Conference Publication, Vol. 2, 414-417. IEEE, 1997.
9. Pavement Management Information System, Rater's Manual for Fiscal Year 2001, Published in June 2000, Texas Department of Transportation.

What is claimed is:

1. A system for determining surface conditions in real time comprising:
    at least one a real time line scan digital camera positioned at least five feet above the surface of the road to capture one or more images of a surface, wherein each of the at least one a real time line scan digital camera views a surface area of at least 6 feet by at least 1.5 feet;
    at least 2 IR laser projectors positioned above and aimed at the surface;
    a light source positioned above and aimed at the surface;
    a frame grabber in optical communication with the at least one a real time line scan digital camera, the at least 2 IR laser line projectors, and the light source; and
    an image processing device that processes the one or more images to identify defects in the surface by
    forming one or more grid cells of one or more pixels,
    determining a pixel grayscale intensity of each of the one or more pixels,
    comparing the pixel grayscale intensity of each adjacent pixel,
    assigning each adjacent pixel as a defect or a non-defect in each of the one or more grid cells, and
    comparing the one or more grid cells to determine the presence of a defect; and
    designates the region as defective.

2. The system of claim 1, wherein the real time digital imaging device comprises two or more line-scan cameras and three or more IR laser line projectors.

3. The system of claim 1, wherein the light source comprises an LED light bar.

4. The system of claim 1, further comprising a display device in communication with the image processing device to display data.

5. The system of claim 1, wherein the real time digital imaging device is positioned about a car, a truck, a van, a bus, an SUV, an ATV, a four wheeler, a trailer, a sled, a wagon, a cart or a combination thereof.

6. The system of claim 1, wherein the intensity of the one or more grid cells discern a pattern and the pattern is compared to a longitudinal template, a transverse template, diagonal template mixtures or combinations thereof, wherein the comparison of the template to the pattern indicates the presence of cracking.

7. The system of claim 1, wherein the image processing device performs formats the one or more images, labels the one or more images and processes the one or more images.

8. The system of claim 1, wherein the image processing device adjusts the acquisition timing of the digital imaging device in relation to the reflectivity of the surface, in relation to the speed at which the digital imaging device is moving relative to the surface or a combination thereof.

9. The system of claim 1,
    wherein the light source comprises one or more LEDs in electrical communication in communication with a power source to produce an emission;
    one or more lenses to focus the emission; and
    one or more mirrors positioned to reflect the emission onto a surface.

10. The system of claim 9, wherein the one or more LEDs are arranged in one or more rows; the one or more lenses comprises one or more cylindrical lenses; and the one or more mirrors comprises 2 mirrors.

11. The system of claim 9, further comprising a wavelength matched filter in optical communication with the real time digital imaging device.

12. The system of claim 1, further comprising one or more global positioning systems, distance measurement systems, road location reference systems, wireless network adaptors, Ethernet adaptors, modems, computers, cameras, sensors or a combination thereof in communication with the image processing device.

13. A method of measuring the condition of a surface in real time measurement comprising the steps of:
    positioning at least one a real time line scan digital camera at least five feet above the surface of the road to capture one or more images of a surface, wherein each of the at least one a real time line scan digital camera views a surface area of at least 6 feet by at least 1.5 feet;
    positioning a light source above and aimed at the surface;
    positioning a frame grabber in optical communication with the at least one a real time line scan digital camera, the at least 2 IR laser line projectors, and the light source; and
    processing the one or more images of a surface with an image processing device by the steps of
    forming one or more grid cells of one or more pixels,
    determining a pixel grayscale intensity of each of the one or more pixels,
    comparing the pixel grayscale intensity of each adjacent pixel, and
    assigning each adjacent pixel as a defect or a non-defect in each of the one or more grid cells; and
    comparing the one or more grid cells to determine the presence of a defect.

14. The method of claim 13, wherein the indicator corresponds to a transverse crack; a longitudinal crack; a diagonal crack, a multi-dimensional crack, a non-cracked feature or a combination thereof.

* * * * *